United States Patent [19]
Ebeling et al.

[11] Patent Number: 6,023,742
[45] Date of Patent: Feb. 8, 2000

[54] RECONFIGURABLE COMPUTING ARCHITECTURE FOR PROVIDING PIPELINED DATA PATHS

[75] Inventors: William Henry Carl Ebeling; Darren Charles Cronquist; Paul David Franklin, all of Seattle, Wash.

[73] Assignee: University of Washington, Seattle, Wash.

[21] Appl. No.: 08/897,094

[22] Filed: Jul. 18, 1997

Related U.S. Application Data

[60] Provisional application No. 60/021,956, Jul. 18, 1996.

[51] Int. Cl.[7] ................................................. G06F 13/14
[52] U.S. Cl. ........................... 710/107; 710/131; 712/10; 712/11; 712/15; 712/17
[58] Field of Search ..................... 395/285–287, 395/309, 290, 800.1, 800.11, 800.15, 800.16, 800.21, 800.22, 800.36; 710/129, 131; 712/17

[56] References Cited

U.S. PATENT DOCUMENTS

| | | | |
|---|---|---|---|
| 4,493,048 | 1/1985 | Kung et al. | 364/754 |
| 4,777,614 | 10/1988 | Ward | 364/754 |
| 4,823,299 | 4/1989 | Chang et al. | 712/1 |
| 5,148,385 | 9/1992 | Frazier | 712/1 |
| 5,274,832 | 12/1993 | Khan | 712/1 |
| 5,588,152 | 12/1996 | Dapp et al. | 395/800.01 |
| 5,600,845 | 2/1997 | Gilson | 395/800.01 |
| 5,752,035 | 5/1998 | Trimberger | 395/705 |
| 5,784,636 | 7/1998 | Rupp | 712/37 |
| 5,794,062 | 8/1998 | Baxter | 395/800.3 |

OTHER PUBLICATIONS

Hartenstein, R. W. et al., "A Datapath Synthesis System for the Reconfigurable Datapath Architecture," ASP–DAC '95 (Aug. Sep. 1995).

Hartenstein, R. W. et al., "A Reconfigurable Data–Driven ALU for Xputers," FCCM '94 (Apr. 1994).

*Primary Examiner*—Ayaz R. Sheikh
*Assistant Examiner*—Raymond N Phan
*Attorney, Agent, or Firm*—Christensen O'Connor Johnson & Kindness PLLC

[57] ABSTRACT

A configurable computing architecture (10) has its functionality controlled by a combination of static and dynamic control, wherein the configuration is referred to as static control and instructions are referred to as dynamic control. A reconfigurable data path (12) has a plurality of elements including functional units (32, 36), registers (30), and memories (34) whose interconnection and functionality is determined by a combination of static and dynamic control. These elements are connected together, using the static configuration, into a pipelined data path that performs a computation of interest. The dynamic control signals (21) are suitably used to change the operation of a functional unit and the routing of signals between functional units. The static control signals (23) are provided each by a static memory cell (62) that is written by a host (13). The controller (14) generates control instructions (16) that are interpreted by a control path (18) that computes the dynamic control signals. The control path is configured statically for a given application to perform the appropriate interpretation of the instructions generated by the controller. By using a combination of static and dynamic control information, the amount of dynamic control used to achieve flexible operation is significantly reduced.

76 Claims, 19 Drawing Sheets

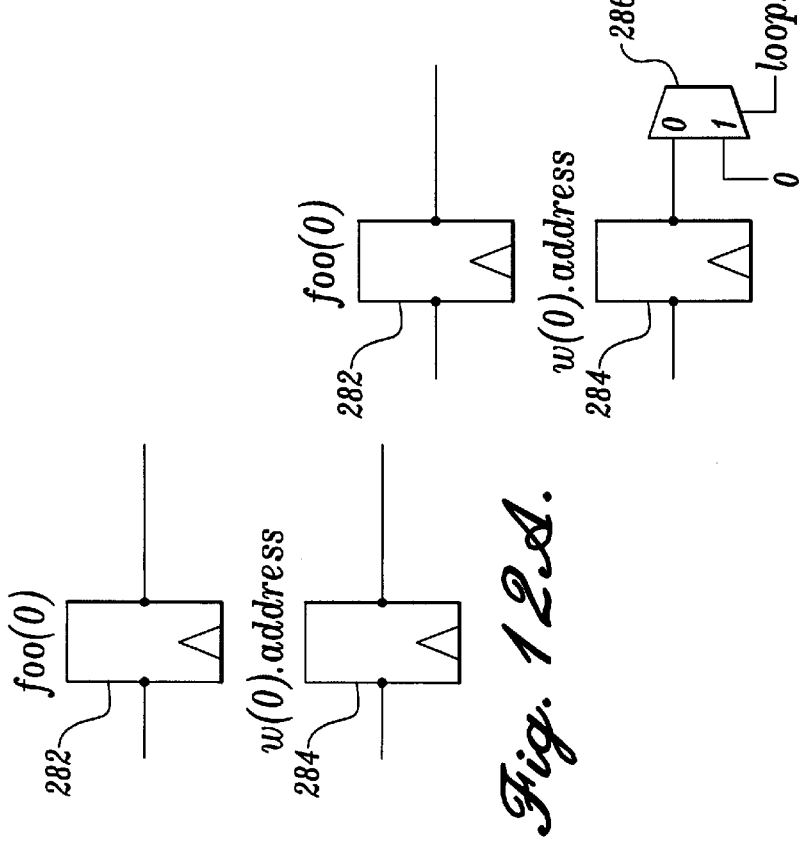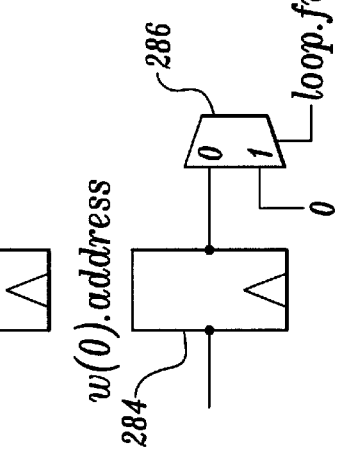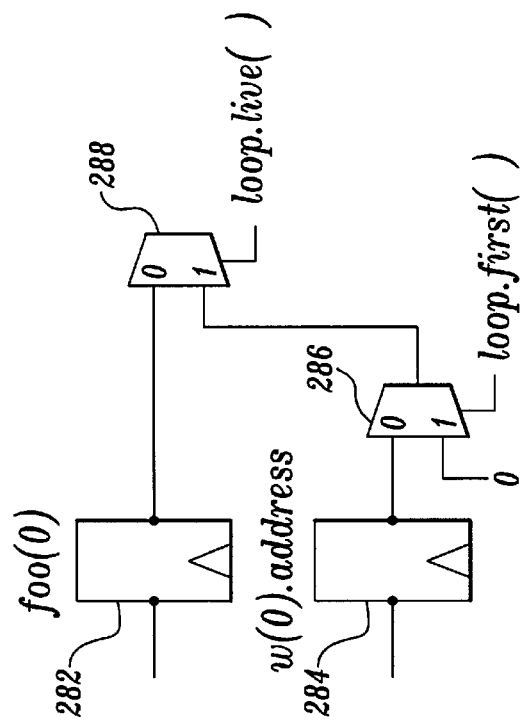

RECONFIGURABLE COMPUTING ARCHITECTURE FOR PROVIDING PIPELINED DATA PATHS

This application claims the benefit of U.S. Provisional Application No. 60/021,956, filed Jul. 18, 1996.

The U.S. Government may have rights in the invention under contract DAAH04-94-G0272.

RELATED APPLICATION

This application is filed pursuant to 35 USC § 111(a) and is based on U.S. provisional patent application Serial No. 60/021,956, filed Jul. 18, 1996, the benefit of the filing date of which is hereby claimed under 35 USC § 119(e).

FIELD OF THE INVENTION

The present invention relates to a configurable computing architecture, and more particularly to a reconfigurable pipelined data path.

BACKGROUND OF THE INVENTION

Special-purpose architectures have long been used to achieve higher performance at a lower cost than general-purpose processors. But as general-purpose processors have become faster and cheaper, special-purpose architectures have been relegated to a shrinking number of special applications. By definition, an application-specific architecture speeds up only one application. This inflexibility, combined with a high design cost, makes special-purpose architectures unattractive except for very well-defined and widespread applications like video processing and graphics.

Configurable computing was developed as an attempt to reverse this trend. The goal of configurable computing is to achieve most of the performance of custom architectures while retaining most of the flexibility of general-purpose computing. This is done by dynamically constructing a custom architecture from an underlying structure of configurable circuitry. Although the concept of configurable computing is very attractive, success has been remarkably hard to achieve in practice.

Most current custom computing machines are constructed from field-programmable gate arrays (FPGAs). These FPGAs contain logic blocks that can be configured to compute arbitrary functions, and configurable wiring that can be used to connect the logic blocks, as well as registers, together into arbitrary circuits. Because FPGAs deal with data at a single-bit level, FPGAs are considered fine-grained. The information that configures an FPGA can be changed quickly so that a single FPGA can implement different circuits at different times. FPGAs would thus appear to be ideally suited to configurable computing.

Unfortunately, the fine-grained circuit structure, which makes them so general, has a very high cost in density and performance. Compared to general-purpose processors (including digital signal processors), which use highly optimized functional units that operate in bit-parallel fashion on long data words, FPGAs are somewhat inefficient for performing logical operations and even worse for ordinary arithmetic. FPGA-based computing has the advantage only on complex bit-oriented computations like count-ones, find-first-one, or complicated bit-level masking and filtering. Depending on the circuit being constructed, this cost/performance penalty can range from a factor of 20 for random logic to well over 100 for structured circuits like arithmetic logic units (ALUs), multipliers, and memory.

Further, programming an FPGA-based configurable computer is akin to designing an application-specific integrated circuit (ASIC). The programmer either uses synthesis tools that deliver poor density and performance or designs the circuit manually, which requires both intimate knowledge of the FPGA architecture and substantial design time. Neither alternative is attractive, particularly for simple computations that can be described in a few lines of a high-level language. Thus, custom computing based on FPGAs is unlikely to compete on applications that involve heavy arithmetic computation.

Other known custom computing machines are constructed from systolic arrays that implement systolic algorithms. For example, see U.S. Pat. No. 4,493,048. Programmable systolic arrays are a form of configurable computing wherein the individual processing elements are programmed to perform the computation required by the systolic algorithm. This allows a programmable systolic array to execute a variety of systolic algorithms. Using programmable processing elements to achieve flexibility is expensive and limits the performance that can be achieved. The program for the processing element must be stored in the element and executed. This execution involves fetching the next instruction and using it to perform the appropriate operation. The computational structure of the element is fixed and must be able to execute all the operations required by the algorithms to be executed. This flexibility means that the structure does not perform the operations in the most efficient way. For example, if a complex operation is to be performed on a single systolic cycle, the complex operation must be broken down into several instructions requiring several clock cycles. In a hard-wired array, the operation could be performed in a single clock cycle by using circuitry capable of executing the entire operation.

In a variety of pipelined computations, there is a certain dataflow that is constant over the entire computation and certain dataflow that changes during the computation. Therefore, it would be desirable to factor out the static computation and generate an instruction set for the remaining dynamic control. However, applying dynamic control to a systolic array would entail a prohibitive amount of computational overhead for generating and implying dynamic control signals. Therefore, there is an unmet need in the art for a configurable computing architecture that can be reconfigured with a minimum amount of dynamic control.

SUMMARY OF THE INVENTION

The present invention is a reconfigurable data path whose functionality is controlled by a combination of static and dynamic control, wherein the configuration is referred to as static control, and instructions are referred to as dynamic control. The present invention is a configurable computing architecture that has a plurality of elements, including functional units, registers, and memories, whose interconnection and functionality are determined by a combination of static and dynamic control. These elements are connected together, using the static configuration, into a pipelined data path that performs a computation of interest. The dynamic control signals are suitably used to change the operation of a functional unit and the routing of signals between functional units. The static control signals are provided each by a static memory cell that is written by a controller, or host. The controller generates control instructions that are interpreted by a control path that computes the dynamic control signals. The control path is configured statically for a given application to perform the appropriate interpretation of the instructions generated by the controller. By using a combination of static and dynamic control information, the amount of dynamic control used to achieve flexible operation is significantly reduced.

According to an aspect of the present invention, a reconfigurable computing architecture executes a plurality of applications, and each application is executed over a plurality of execution cycles. The architecture includes means for generating a set of first signals having a state that remains unchanged over the execution cycles of any one of the applications, means for generating a set of second signals having states that are changeable over the execution cycles, and means for inputting and outputting data. A linear array of interconnectable functional units is provided, and each functional unit is arranged to perform a plurality of functions on the data. The function performed on the data by the array is selectable by the first signals and the second signals. Means for interconnecting the functional units is provided. The interconnecting means is arranged to receive the data from the input and output means and to provide the data to the functional units. The interconnecting means interconnects the functional units such that flow of the data between the functional units is selectable.

According to another aspect of the present invention, a reconfigurable computing architecture executes a plurality of applications, and each application is executed over a plurality of execution cycles. The architecture includes means for generating a set of first signals having a state that remains unchanged over the execution cycles of any one of the applications, means for generating a set of instructions having states that are changeable over the execution cycles. A linear array of interpreters receives the set of instructions and provides a set of second signals having states that are changeable over the execution cycles. Means for interconnecting the interpreters and means for inputting and outputting data are provided. A linear array of interconnectable functional units is provided, and each functional unit is arranged to perform a plurality of functions on the data. The function performed on the data by the array is selectable by the first signals and the second signals. Means for interconnecting the functional units are arranged to receive the data from the input and output means and to provide the data to the functional units. The functional units are interconnected by the means for interconnecting the functional units such that the flow of data between the functional units is selectable.

According to another aspect of the present invention, a method is provided for mapping a computational application to a reconfigurable computing architecture for executing a plurality of applications. A number of computational stages to map to the array are specified. A control tree that represents execution cycles within the application is specified, and a computation to be mapped to the stages is specified. The computation specification is converted to a specification of the interconnected functional units, and the second control signals are labeled with a set of the first expressions derived from variables in the control tree. A set of second expressions is generated from the set of first expressions, and the second expressions represent the set of instructions that are input to the interpreters. A configuration of the interpreters for enabling the interpreters to convert the second expressions into the first expressions is generated, and the configuration of the remaining signals in the first set is generated.

By reducing the amount of dynamic control, fewer computational resources are required for generating the dynamic control. As a result, less die area is used to generate dynamic control and less power is consumed in producing the dynamic control. Less die area results in increased packing density, shorter connections between functional units, and increased operating speed.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 12A–12F are illustrations of netlists according to the present invention.

DETAILED DESCRIPTION OF THE PREFERRED EMBODIMENT

Figure 1:
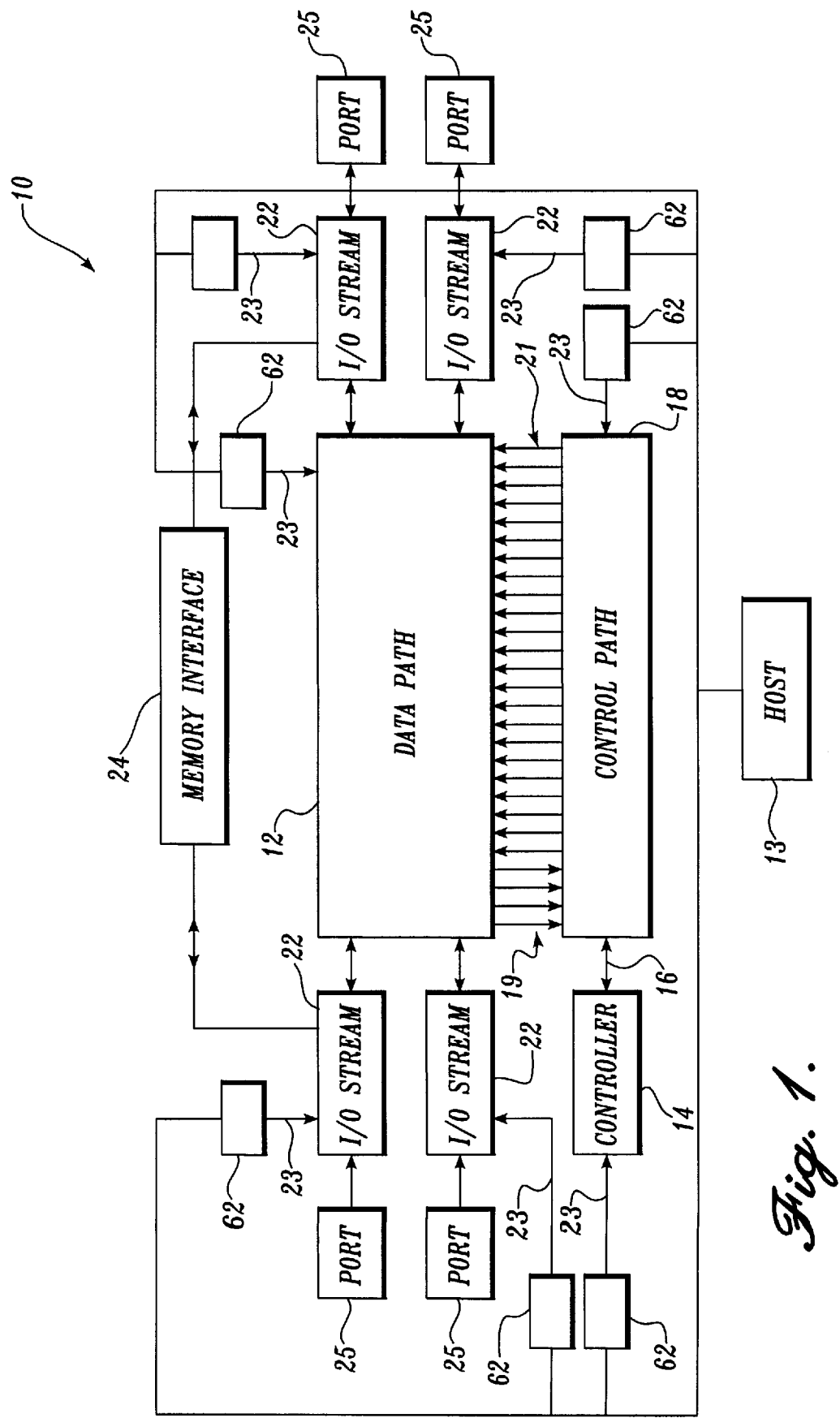
FIG. 1 is a block diagram of a reconfigurable pipelined data path according to the present invention.

FIG. 1 shows a block diagram of a configurable computing architecture 10 according to the present invention. The architecture 10 includes a data path 12 that includes functional units whose interconnections are configurable using control signals 20 that include static control signals 23 and dynamic control signals 21. The static control signals 23 are used to configure the data path 12, the controller 13, the control path 18, and the I/O streams 22, and are generated by a host 13, such as a processor and stored in an array of memory cells 62. The dynamic control signals 21 are used to change the operation of the data path 12 over time by changing the function performed by each element of the data path and changing the flow of data. A controller 14 generates control instructions 16 that are inserted into a control path 18. The control path 18 interprets the control instructions 16 and provides the dynamic control signals 21 to the data path 12. Data enters and exits the data path 12 via input/output (I/O) streams 22. A memory interface 24 performs memory read and write operations on behalf of the I/O streams 22. Alternatively, data can be brought into and out of the I/O streams 22 via ports 25.

Figure 2:
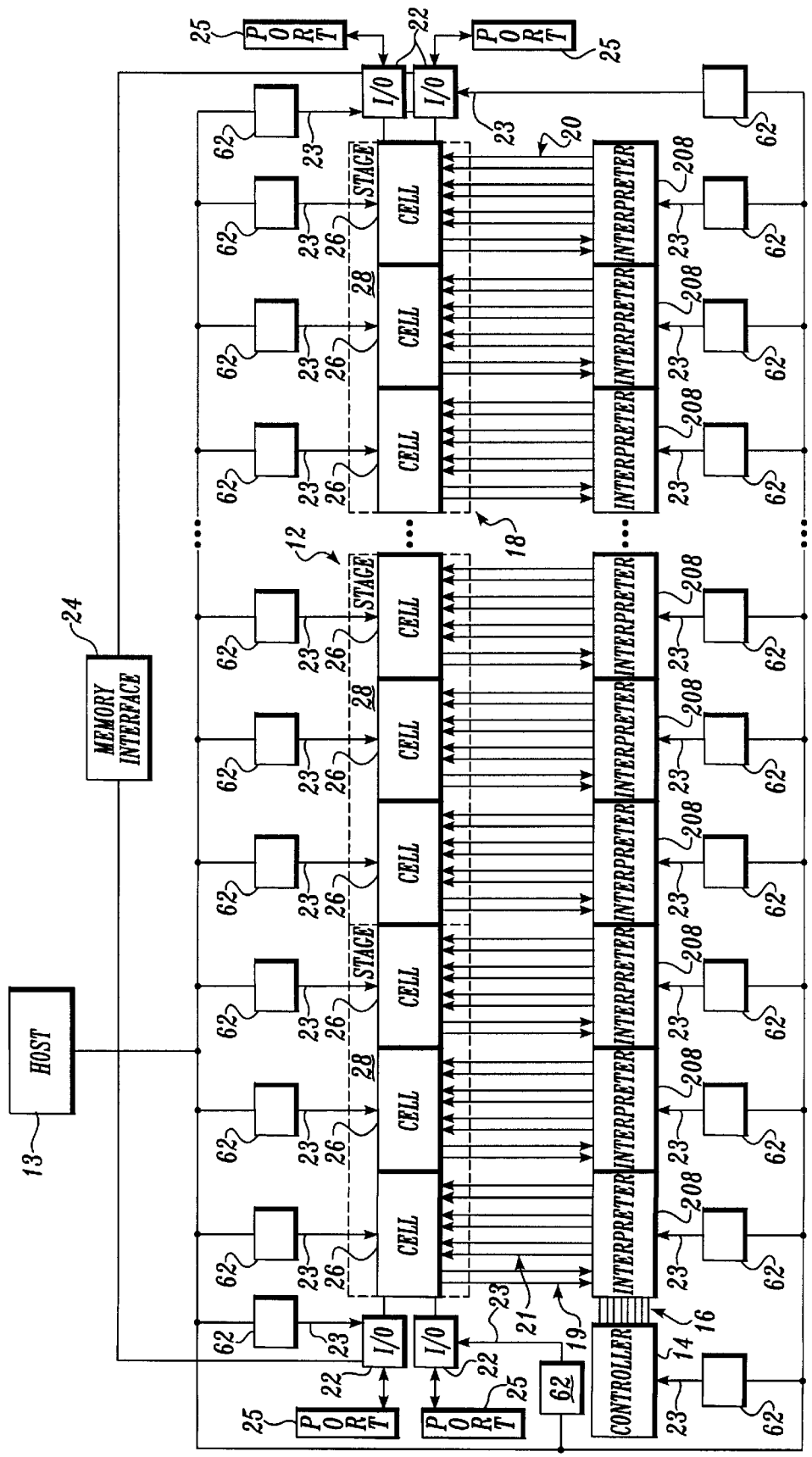
FIG. 2 is a detailed block diagram of the reconfigurable pipelined data path of FIG. 1.

FIG. 2 shows a detailed block diagram of the configurable computing architecture 10. The data path 12 is a linear array of cells 26. Each cell 26 includes functional units, such as multipliers, arithmetic logic units (ALUs), general-purpose registers, and local memories, such as random access memory (RAM). The data types (e.g., fixed or floating point) are determined by the form of the functional units present in the particular implementation of the architecture. Each cell 26 provides status signals 19 to the control path 18. Each cell 26 may be identical and replicated throughout the data path 12. However, this is not necessary for purposes of the present invention, and the cells 26 may each include different functional units and may be interconnected in different ways, as desired for a particular implementation of the architecture. The data path 12 includes a suitable number of cells 26 as desired for a particular implementation of the architecture. For example, the data path 12 suitably contains sixteen cells 26 or thirty-two cells 26, as desired. It will be appreciated that the number of cells 26 in the data path 12 is given by way of nonlimiting example only, and any number of cells 26 may be included in the data path 12 as desired for a particular implementation of the architecture. The cells 26 are grouped in stages 28. Each stage 28 represents a higher level grouping of cells 26, and may be replicated as desired for a particular application. It will be appreciated that boundaries of the cells 26 and boundaries of the stages 28 are shown for illustrative purposes only; the cells 26 represent the way the data path 12 is implemented physically, and the stages 28 represent the way a pipeline is configured onto the data path 12.

Figure 3:
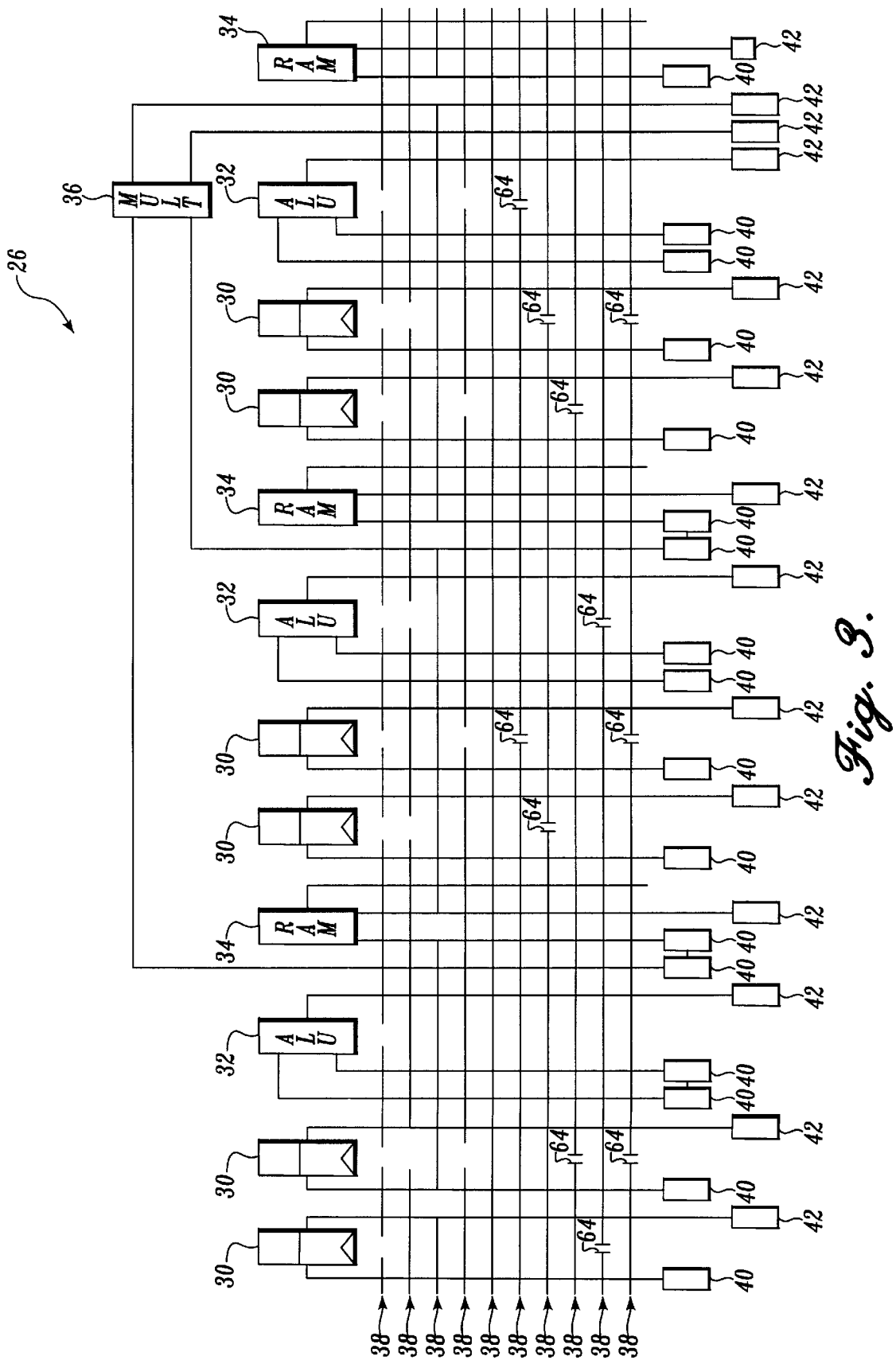
FIG. 3 is a block diagram of a cell of functional units.

FIG. 3 shows a detailed block diagram of the functional units and interconnections within one of the exemplary cells 26. The cell 26 includes registers 30, ALUs 32, local memories 34, and a multiplier 36. The functional units of the cell 26 are interconnected with segmented buses 38 that are arranged in tracks, suitably rows, that extend the length of the data path 12. It will be appreciated that the segmentation for the buses 38 is given by way of nonlimiting example and that other segmentations are suitably included in the data path 12. Each input of each functional unit, such as the ALU 32 and the multiplier 36, is electrically connected to a multiplexer 40. Each output of the functional units, such as the ALU 32 and the multiplier 36, is electrically connected to a switch 42.

Figure 3A:
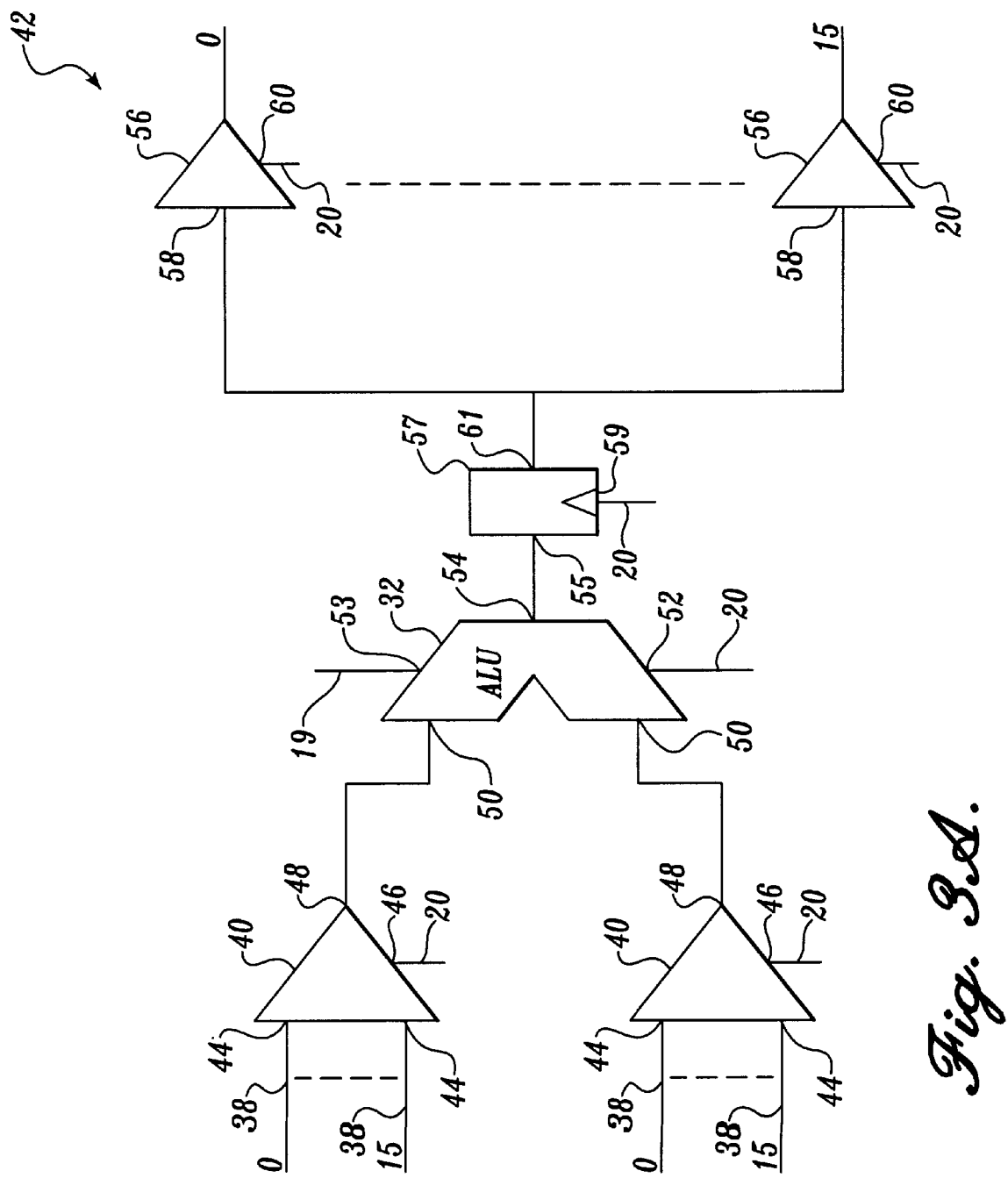
FIG. 3A is a detailed block diagram of an exemplary functional unit.

FIG. 3A shows a detailed block diagram of exemplary input and output connections for one of the functional units in the cell 26. In the nonlimiting example shown in FIG. 3A, the multiplexers 40 each have N input terminals 44 that are each electrically connected to one of N buses. N may be any number of buses 38, such as 8 or 16, or any acceptable number as desired for a particular implementation of the architecture. Each multiplexer 40 has a control terminal 46 that is electrically connected to receive a suitable control signal 20. In a presently preferred embodiment, the control signal 20 provided to the input terminal 46 is a dynamic control signal, allowing different inputs to be selected on each clock cycle. However, all or part of the control signal 20 may suitably be a static control signal, as desired. A status terminal 53 of the ALU 32 provides a status signal 19, such as an overflow bit. An output terminal 48 of each multiplexer 40 is electrically connected to an input terminal 50 of the ALU 32. The ALU has a control terminal 52 that is electrically coupled to receive a control signal 20. In a preferred embodiment of the present invention, the control signal 20 supplied to the control terminal 52 is a dynamic control signal. However, all or part of the control signal 20 applied to the control terminal 52 is suitably a static control signal, as desired. An output terminal 54 of the ALU 32 is electrically coupled to an input terminal 55 of a register 57. The register 57 has a control terminal 59 that is coupled to receive a control signal 20. An output terminal 61 of the register 57 is electrically connected to one of the switches 42. In the preferred embodiment, the switch 42 includes N tristate drivers 56. It will be appreciated that any switch 42 that can drive a subset of the buses 38 is suitably included in data path 12. Each tristate driver 56 has an input terminal 58 that is electrically connected to the output terminal 61 of the register 57. A control terminal 60 of each tristate driver 56 is electrically coupled to receive a control signal 20.

Each of the tristate drivers 56 is configured independently. This allows an output to fan out to several buses 38, or none at all if the functional unit is unused. Unlike the multiplexers 40, the output switches 42 are configured statically in a presently preferred embodiment. Configuring the tristate drivers 56 dynamically would reduce the number of the buses 38 used and would allow multiplexing using tristate buses, but this would increase bus delay. The delay until the bus value is stable would depend on the delay of the control signal 20, which would then be on a critical path, that is, the path in the circuit, as configured, that determines the minimum length of a clock cycle. By contrast, the delay of the control signal 20 for the dynamically controlled multiplexer 40 occurs in parallel with the bus delay. Dynamically controlling the switches 42 would also greatly increase the number of dynamic control signals, which entails substantially more circuitry to implement than static control signals. However, dynamic control of the switches 42 is suitably included in the data path 12.

Figure 4:
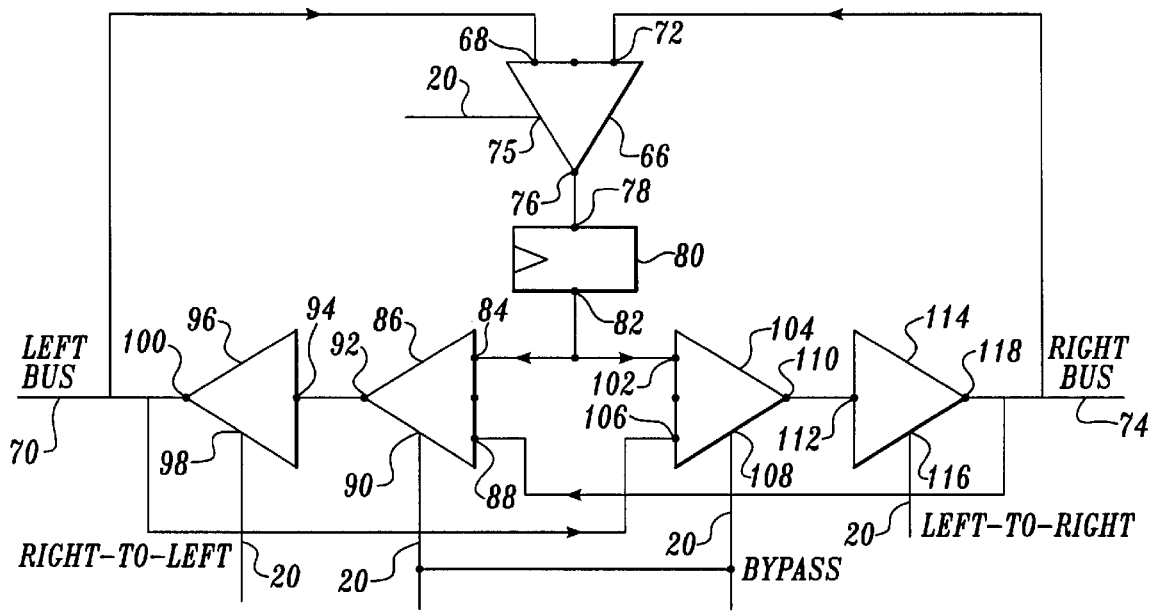
FIG. 4 is a block diagram of a bus connector.

Referring back to FIG. 3, segments of some of the buses 38 are connected by bus connectors 64. The buses 38 are segmented into different lengths so the tracks can be used efficiently. FIG. 4 shows a detailed block diagram of one of the bus connectors 64. A multiplexer 66 has an input terminal 68 electrically connected to a left bus segment 70 and another input terminal 72 electrically connected to a right bus segment 74. A control terminal 75 of the multiplexer 66 is connected to a control signal 20. An output terminal 76 of the multiplexer 66 is electrically connected to an input terminal 78 of a register 80. An output terminal 82 of the register 80 is electrically connected to an input terminal 84 of a multiplexer 86. Another input terminal 88 of the multiplexer 86 is electrically connected to the right bus segment 74. A control terminal 90 of the multiplexer 86 is coupled to receive a control signal 20. The register 80 may include multiple registers in series that can be configured to provide a fixed number of clock cycles from input to output. Such pipeline registers can also be placed on the inputs or outputs of functional units and can be configured to provide the desired delay via the control signal 20. An output terminal 92 of the multiplexer 86 is electrically coupled to an input terminal 94 of a driver 96. A control terminal 98 of the driver 96 is coupled to receive a control signal 20. An output terminal 100 of the driver 96 is electrically connected to the left bus segment 70.

An input terminal 102 of a multiplexer 104 is also electrically connected to the output terminal 82 of the register 80. Another input terminal 106 of the multiplexer 104 is electrically connected to the left bus segment 70. A control terminal 108 of the multiplexer 104 is coupled to receive the same control signal 20 provided to the control terminal 90. An output terminal 110 of the multiplexer 104 is electrically connected to an input terminal 112 of a driver 114. A control terminal 116 of the driver 114 is coupled to receive a control signal 20. An output terminal 118 of the driver 114 is electrically connected to the right bus segment 74.

The bus connector 64 is an active device that can drive data in either direction down the data path 12, but not both directions at once. The bus connector 64 can be configured into one of five different modes: Disconnected, Connected Left, Connected Right, Registered Left, and Registered Right. In the Disconnected mode, the bus connector 64 does not drive either the left bus segment 70 or the right bus segment 74. In the Connected Left mode, the bus connector 64 drives the signal on the right bus segment 74 onto the left bus segment 70. The multiplexer 86 drives the data on the right bus segment 74 to the input terminal 94 of the driver 96, and the driver 96 drives the data at the input terminal 94 onto the left bus segment 70. In the Connected Right mode, the bus connector 64 drives the signal on the left bus segment 70 onto the right bus segment 74. The multiplexer 104 drives the data on the left bus segment 70 to the input terminal 112 of the driver 114, and the driver 114 drives the data at the input terminal 112 onto the right bus segment 74. In the Registered Left mode, the bus connector 64 drives the left bus segment 70 with the signal on the right bus segment 74 after a configurable delay. The multiplexer 66 drives data from the left bus 70 to the input terminal 78 of the register 80. After the configurable delay, which is determined by the control signal 20 within the limits of the particular implementation of the architecture, the register 80 outputs its contents to the output terminal 82. The data at the output terminal 82 is driven onto the right bus segment 74 as described above. In the Registered Right mode, the bus connector 64 drives the right bus segment 74 with the signal on the right bus segment 74 after a configurable delay. The multiplexer 66 drives data from the right bus 74 to the input terminal 78 of the register 80. After the configurable delay, that is determined by the control signal 20 within the limits of the particular implementation of the architecture, the register 80 outputs its contents to the output terminal 82. The data at the output terminal 82 is driven onto the left bus segment 70 as described above. It will be appreciated that only in the Registered Left mode and the Registered Right mode is the data transfer synchronous. In a presently preferred embodiment, the control signals 20 that determine the mode are static control signals 23.

The data that flow through the data path 12 are suitably integers, fixed-point, or floating-point numbers, as desired for a particular implementation of the architecture. In a presently preferred embodiment, the architecture 10 is used to compute signed or unsigned fixed-point data that is maintained via shifters associated with the multipliers 36 (FIG. 3). Alternative fixed-point representations can be used for a same application by suitably configuring other shifters in the data path 12. All of the buses 38 suitably have the same width that matches the width of the data operated on by the functional units. It will be appreciated that some functional units, such as shifters or dividers, may utilize double-width data values that are communicated via two of the buses 38. It will also be appreciated that some other functional units, such as shifters or multipliers, produce double-width data values that are also communicated via two of the buses 38. The double-width data values are suitably treated as two independent single-width data values and are suitably routed independently, such as to two different registers 80.

The functional units included in the data path 12 will be discussed next. It will be appreciated that the functional units shown in FIG. 3 and described in detail below are given by way of nonlimiting example, and that other functional units are suitably included in the data path 12. For example, for specific computational domains a special-purpose functional unit may suitably be used. For other computational domains, configurable functional units are suitably used. For example, a configurable functional unit could be constructed of FPGA-like cells that could be configured to compute a particular fixed function or set of functions. Examples of such special-purpose or configurable functions include bit manipulation functions like find-first-one, count-ones, and normalize.

Referring back to FIG. 3, the ALU 32 is suitably a general-purpose ALU that performs logic and arithmetic operations that are well known in the art. In one nonlimiting example, two ALUs 32 in a cell 26 can be configured in a pipelined manner to compute a double-width operation, such as a 32-bit add for multiply-accumulate computations. The output register of the ALU 32 is also suitably used as an accumulator for multiply-accumulate operations.

Still referring to FIG. 3, the multiplier 36 multiplies two input values and produces a double-width result, shifted by a statically programmed amount to maintain an appropriate fixed-point representation. Both halves of the result are available as output via separate switches 42. Either one of the separate switches 42 can be turned off to drop the corresponding output if it is not desired. Depending on the data width, the multiplier 36 is suitably pipelined internally.

Figure 5:
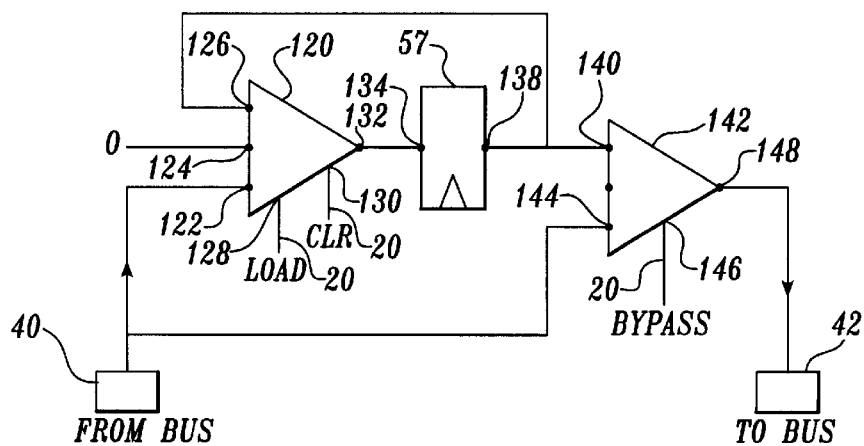
FIG. 5 is a block diagram of a data path register.

Referring now to FIGS. 3 and 5, the register 30 includes a multiplexer 120 having an input terminal 122 that is electrically connected to one of the multiplexers 40. Another input terminal 124 of the multiplexer 120 is coupled to receive a logic low signal. The multiplexer 120 includes another input terminal 126. A control terminal 128 of the multiplexer 120 is coupled to receive a dynamic control signal 20. Another control terminal 130 of the multiplexer 120 is also coupled to receive another dynamic control signal 20. An output terminal 132 of the multiplexer 120 is electrically connected to an input terminal 134 of one of the registers 57. An output terminal 138 of the register 57 is electrically connected to the input terminal 126 of the multiplexer 120 and is also electrically connected to an input terminal 140 of a multiplexer 142. Another input terminal 144 of the multiplexer 142 is electrically connected to the output terminal of the multiplexer 40. A control terminal 146 of the multiplexer 142 is coupled to receive a control signal 20. An output terminal 148 of the multiplexer 142 is electrically connected to one of the switches 42. The register 57 has a configurable delay determined by the control signal 20 within the limits of the particular implementation of the architecture.

The registers 30 in the data path 12 are suitably used to store constants and temporary values as well as to create pipelines of different lengths. The registers 30 are suitably general registers and may include multiple registers in series that can be statically configured to provide a fixed number of clock cycles from input to output. In response to the control signal 20 at the input terminal 146, the register 57 is bypassed and the data from the multiplexer 142 is driven to the switch 42. For example, the register 57 is bypassed to connect a bus segment on one track to a bus segment in a different track, or suitably to several other bus segments. The control signal 20 at the control terminal 128 is suitably a signal to load the register 57, and the control signal 20 at the control terminal 130 is suitably a signal to clear the register 57.

Figure 6:
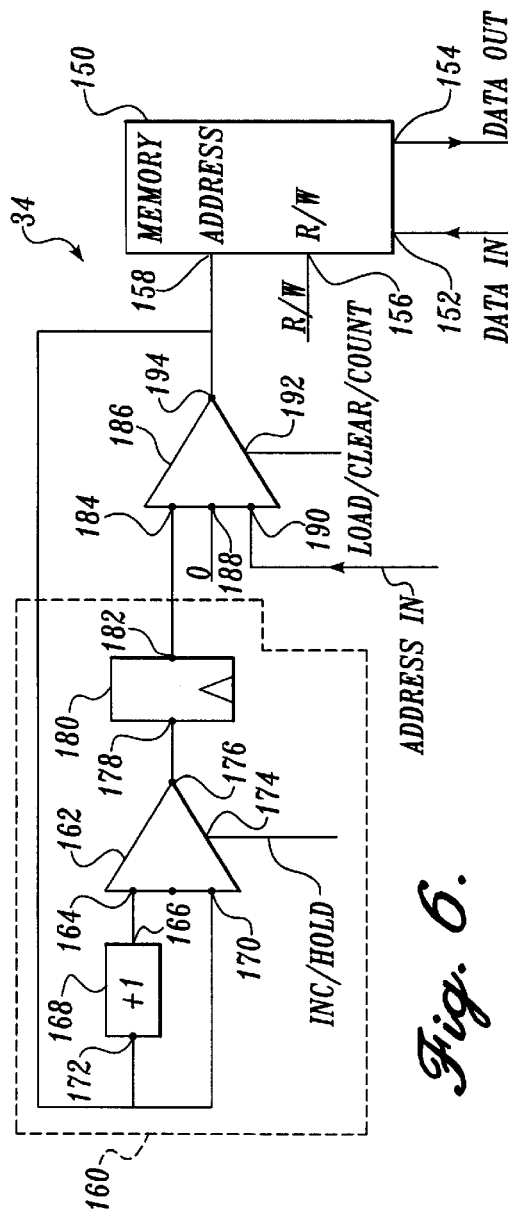
FIG. 6 is a block diagram of a local memory.

FIG. 6 shows a presently preferred implementation of the local memory 34 shown in FIG. 3. The local memory 34 includes a memory array 150 that has a data input terminal 152 that is coupled to receive data from one of the multiplexers 40. The memory array 150 has a data output terminal 154 that is electrically coupled to output its data to one of the switches 42. A control terminal 156 of the memory array 150 is coupled to receive a read/write control signal R/W. The memory array 150 includes an address input terminal 158 that is coupled to receive an address signal from an address generator 160. The address generator 160 includes a multiplexer 162 that has an input terminal 164 that is electrically connected to an output terminal 166 of an incrementer 168. A control terminal 174 of the multiplexer 162 is coupled to receive an increment/hold control signal, INC/HOLD. An output terminal 176 of the multiplexer 162 is electrically connected to an input terminal 178 of a register 180. An output terminal 182 of the register 180 is electrically connected to an input terminal 184 of a multiplexer 186. Another input terminal 188 of the multiplexer 186 is coupled to receive a logic low signal. Another input terminal 190 of the multiplexer 186 is coupled to receive an address input signal, AddressIn, that is generated by one of the multiplexers 40. A control terminal 192 of the multiplexer 186 is coupled to receive a control signal load/clear/count. An output terminal 194 of the multiplexer 186 is electrically connected to the input terminal 172 of the incrementer 168 and the input terminal 170 of the multiplexer 162. The output terminal 194 of the multiplexer 186 is also electrically connected to the address input terminal 158 of the memory array 150. The address generator 160 supplies an address to the address input terminal 158 without using any resources of the data path 12.

It will be appreciated that the address generator 160 performs the following functions: clear, with optional post-increment; load, with optional post-increment; and hold, with optional post-increment. It will also be appreciated that the address generator 160 is not necessary for providing an address signal to the address input terminal 158 of the memory array 150. Alternatively, the address input signal may be provided to the address input terminal 158 by a value supplied by one of the functional units in the data path 12. However, the most common use of memory is to access addresses in sequential order, and the address generator 160 can supply sequential addresses without using any resources of the data path 12. Therefore, use of the address generator 160 is preferred.

Referring back to FIGS. 1 and 2, the I/O streams 22 act as interfaces with external memory. Each I/O stream 22 can be configured as either an input stream or an output stream, but not as both an input stream and an output stream. Each I/O stream 22 contains a first in, first out set of registers (FIFO) that is filled with data used by a computation or with the results produced by the computation. The data for each I/O stream 22 are associated with a predetermined block of memory from which they are read or to which they are written. The data path 12 reads from an input stream to obtain the next input data value and writes to an output stream to store a result. The I/O streams 22 generate addresses and read from and write to memory in a known manner. The FIFOs in the I/O streams 22 operate independently. That is, if the data path 12 reads a value from an empty FIFO of one of the I/O streams 22 or writes a value to a full FIFO in one of the I/O streams 22, the data path 12 is stalled until the FIFO is ready. Data is put into the FIFOs and extracted from the FIFOs by an external process, an example of which is using an external memory and a memory controller. In an alternate embodiment of the present invention, the data path 20 operates asynchronously, such as by using handshakes instead of a global stall. Each I/O stream 22 contains a simple controller well known in the art that is capable of executing general nested loops and simple address arithmetic. The compiler generates a program for each controller of each I/O stream 22. The controller 14 runs independently of the data path 12 to produce a memory address for filling the FIFO for an input stream or for emptying the FIFO for an output stream.

Still referring to FIGS. 1 and 2, the memory interface 24 performs read and write operations to external memory on behalf of the I/O streams 22. The memory interface 24 coordinates use of external memory to achieve maximum memory bandwidth by use of techniques such as out-of-order access and use of cache memory, for example. Alternatively, the ports 25 provide data and/or remove data from the I/O streams 22. For example, the ports 25 may be hard-wired connections between the I/O streams 22 and external sources of raw data.

Control of the data path 12 will be discussed next. In a presently preferred embodiment, control of the multiplexers 40, the ALUs 32, and the registers 30 is by use of the dynamic control signals 21. Also, in the presently preferred embodiment, control of the switches 42 and the bus connectors 64 is by the static control signals 23 supplied by the SRAM cells 62. One example of the use of the dynamic control signals 21 is for loading data into the data path registers 30 (FIGS. 3 and 5) during initialization for later use during computation. The dynamic control signal 21 of the data path registers 30 thus takes on different values during initialization and computation. Other examples of operations that use the dynamic control signals 21 include double buffering of the local memories 34 and performing data-dependent calculations. The use of the dynamic control signals 21 for controlling the multiplexers 40 allows the functional units to change the source of their input over the course of a computation. It will be appreciated that any designation of a control signal 20 as a static control signal 23 or a dynamic control signal 21 is a suitable implementation of the architecture, as long as some part of the control signal 20 includes a dynamic control signal 21.

Figure 7:
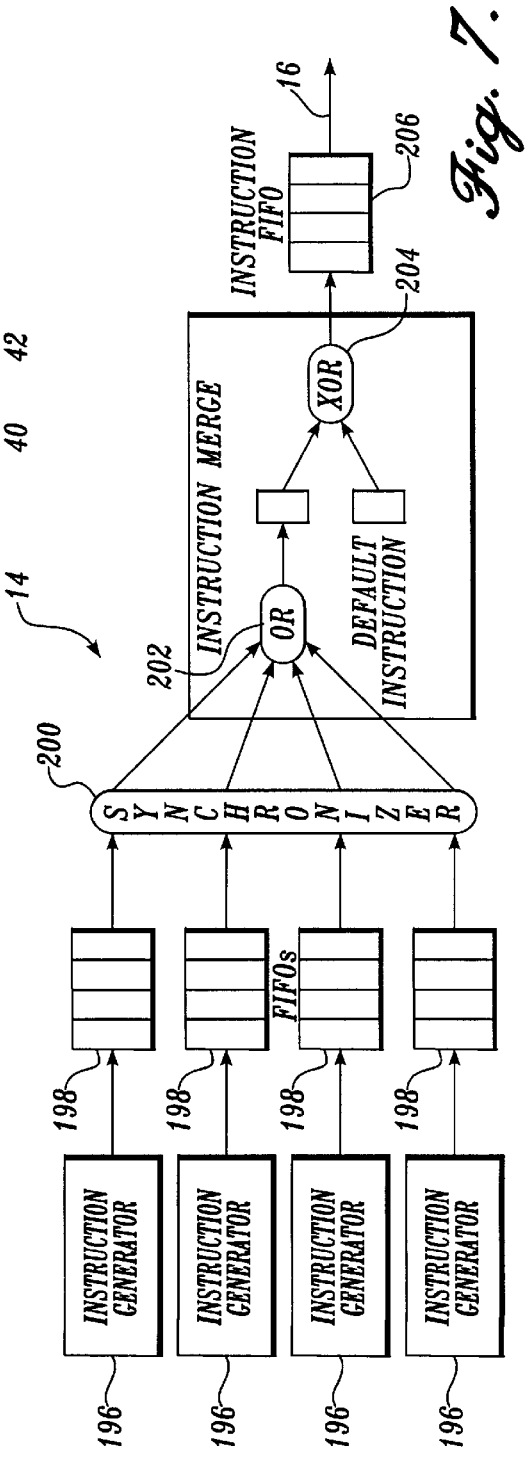
FIG. 7 is a block diagram of a controller.

The dynamic control signals 21 are generated through the coaction of the controller 14 and the control path 18. Referring to FIGS. 1, 2, and 7, the controller 14 executes a program that inserts a control instruction 16 into the control path 18 every cycle. An exemplary controller 14 is shown in FIG. 7. The controller 14 includes instruction generators 196 that generate instructions that contain all the information required by the control path 18 to compute the dynamic control signals 21 for the stages 28 in the data path 12. The output of the instruction generators 196 is provided to instruction FIFOs 198. The instruction FIFOs 198 provide their output to a synchronizer 200. The synchronizer 200 decouples the controller 14 from the control path 18. If no instructions are available in their associated FIFO 198, then the data path 12 stalls until an instruction is available in the FIFO 198. Thus, the instruction FIFO 198 operates similarly to the I/O stream FIFOs. Thus, the controller 14 can run at twice the clock rate of the data path 12 and can output one control instruction 16 on average once every other clock cycle. The output of the synchronizer 200 is input to an OR gate 202. The output from the OR gate 202 is input to an exclusive OR gate 204. A default instruction is also input to the exclusive OR gate 204. The output of the exclusive OR gate 204 is a final instruction that is input into an instruction FIFO 206. It will be appreciated that the controller 14 (FIG. 7) is given by way of nonlimiting example. A suitable alternative embodiment is an array of memory, such as a RAM, large enough to hold all the instructions 16.

Figure 8:
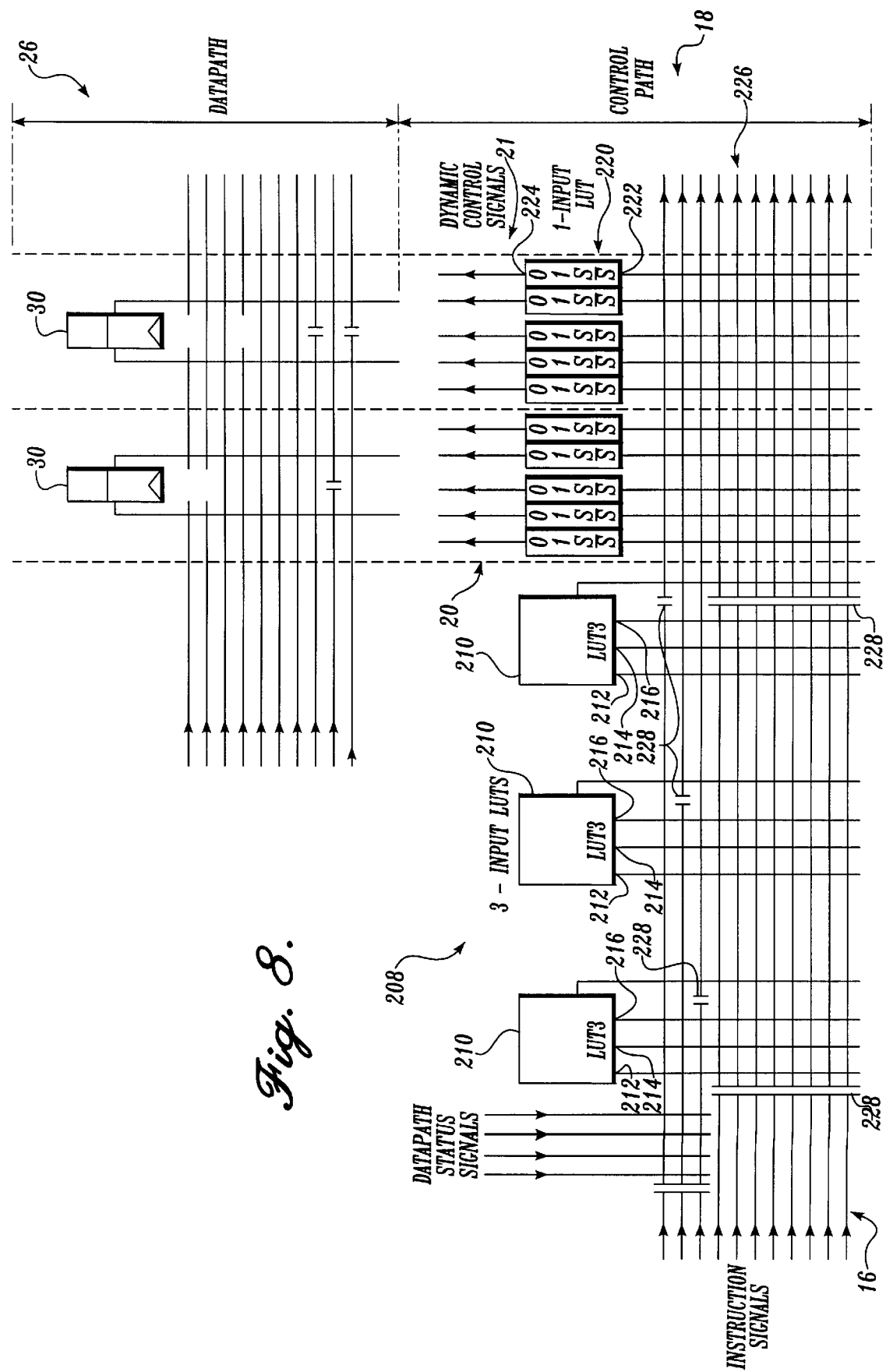
FIG. 8 is a block diagram of a portion of a control path.

Referring now to FIGS. 1, 2, and 8, generation of the dynamic control signals from the control instructions 16 will now be discussed. Referring now to FIG. 2, the control path 18 includes a linear array of interconnected interpreters 208. Each of the interpreters 208 is associated with a corresponding cell 26 of the data path 12. As will be discussed below, the control instructions 16 are pipelined down the array of interpreters 208 and translated into appropriate dynamic control signals 21, and the dynamic control signals 21 are passed to the associated cell 26 as the data is pipelined down the data path 12. Referring now to FIG. 8, the interpreter 208 includes three-input lookup tables (LUTs) 210. Each of the three-input LUTs 210 includes input terminals 212, 214, and 216 and an output terminal 218. The interpreter 208 also includes one-input LUTs 220. Each of the one-input LUTs 220 has an input terminal 222 and an output terminal 224. The instruction signals 16 are pipelined down the control path 18 via buses 226 that are interconnected with bus connectors 228. The bus connectors 228 are similar to the bus connectors 64 (FIGS. 3 and 4).

The dynamic control signals 21 are generated as follows. The control instructions 16 are inserted into the control path 18 and flow in a pipelined manner down the control path 18 in the same direction that data flows in the data path 12. Simple dynamic control signals 21 are produced by one of the one-input LUTs 220. Depending on which of four possible values are selected by the static configuration of the one-input LUT 220, the one-input LUT 220 outputs its input signal, the complement of its input signal, a constant 0, or a constant 1. It will be appreciated that the simple dynamic control signals that are generated by the one-input LUTs 220 are suitably constants such as 0 or 1. More complicated dynamic control signals 21 are generated by the three-input LUTs 210. The three-input LUTs 210 compute a function over the signals present at the three-input terminals 212, 214, and 216 that can include signals from the buses 226, the status signals 19 from the data path 12, registered feedback from the three-input LUTs 210, or output signals from any of the other three-input LUTs 210. The output signal present at the output terminals 218 of the three-input LUTs 210 can be connected to one of the buses 226 to be used locally or to be forwarded to the next interpreter 208. The three-input LUTs 210 allow the control instructions 16 to be encoded and then decoded locally into the dynamic control signals 21. The three-input LUTs 210 also allow the status signals 19 from the data path 12 to be used to change a dynamic control signal 21. For example, referring back to FIG. 3A, status bits 19 generated by the ALU 32 can be used to select the operation or the input of another ALU 32. It will be appreciated that the three-input LUTs 210 that are embedded in the control path 18 suitably could have any number of inputs. However, three inputs are used in a presently preferred embodiment because the three-input LUTs 210 are able to compute most of the desired functions in the control path 18. It will also be appreciated that the number of LUTs varies with particular implementations of the architecture, and that other logic circuitry could be substituted for the LUTs.

Figure 8A:
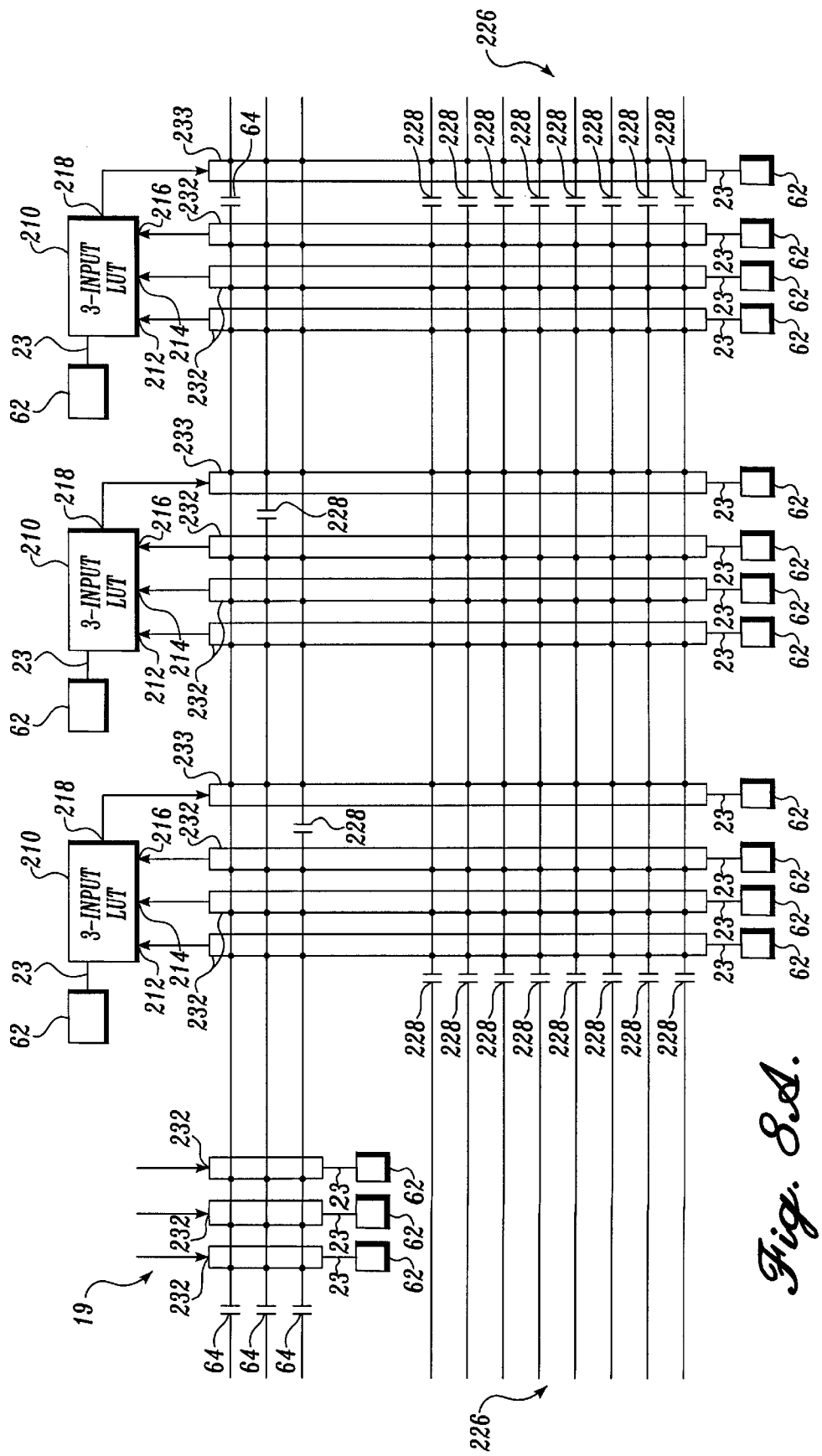
FIG. 8A is a detailed block diagram of a portion of the control path of FIG. 8.

FIG. 8A shows a detailed block diagram of interconnections between the three-input LUTs 210 and the buses 226. Each three-input LUT 210 is coupled to receive a static control signal 23 from a memory cell 62. The output terminal 218 of the three-input LUT 210 is coupled to a switch 233, that is similar to the switch 42. The status signals 19 are input to the multiplexers 232 for connection to the appropriate buses 226.

Figure 9:
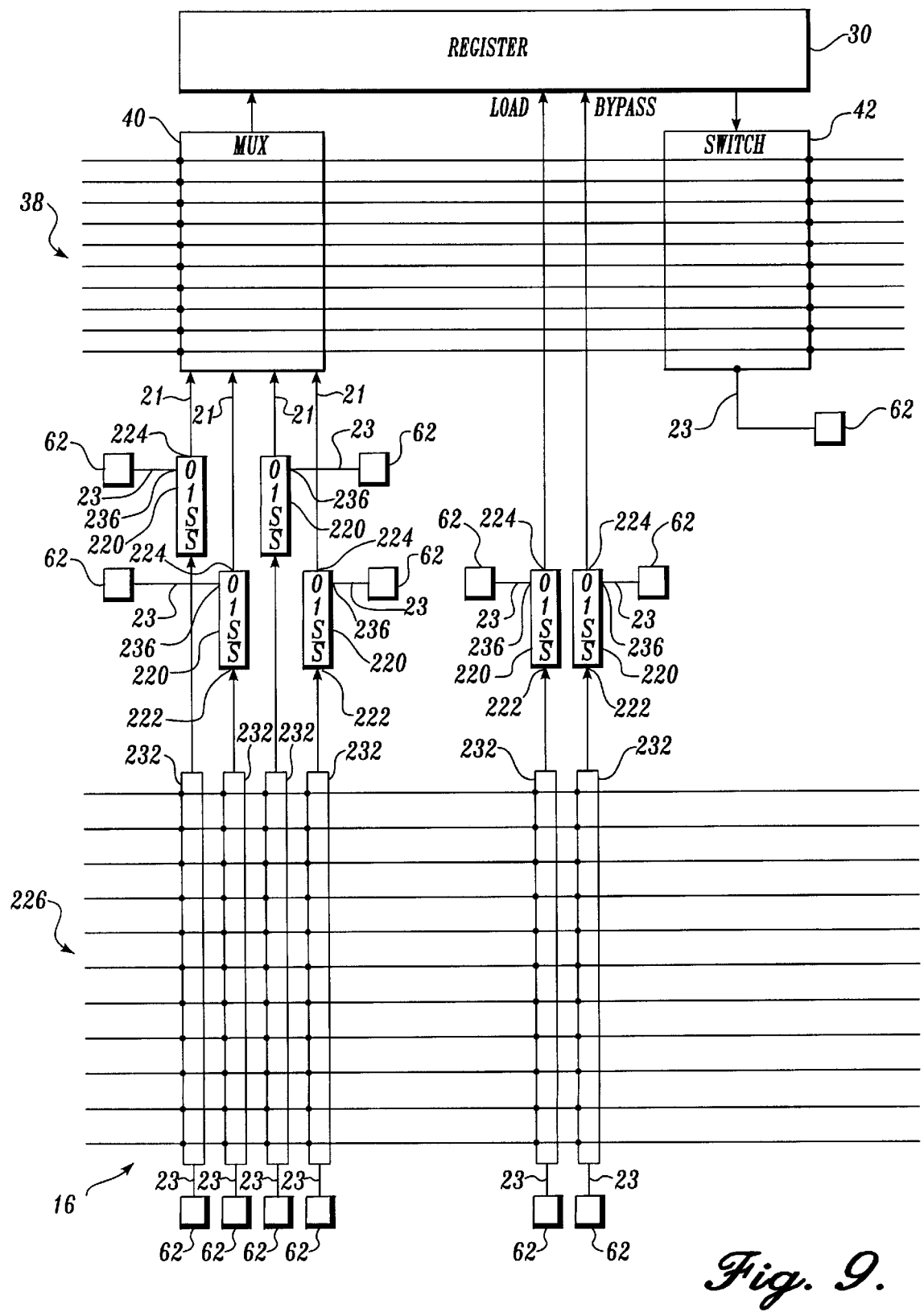
FIG. 9 is a block diagram of another portion of the control path.

FIG. 9 shows how one of the data path registers 30 is connected to the data path buses 38 and how the dynamic control signals 21 for the register 30 are generated from the control buses 226. The memory cells 62 provide the static control signals 23 to input terminals 230 of multiplexers 232. The multiplexers 232 have output terminals 234 that are electrically connected to the input terminals 222 of the one-input LUT 220. Each of the one-input LUTs 220 has a control terminal 236 coupled to receive a static control signal 23 from a memory cell 62. The output terminals 224 of the one-input LUTs 220 are coupled to provide the dynamic control signal 21 to the multiplexer 40. The output terminals 224 of two of the one-input LUTs 220 are coupled to provide the signals LOAD and BYPASS (FIG. 5) to the register 30. One of the memory cells 62 provides a static control signal 23 to the switch 42 that is in turn electrically connected to the register 30.

Figure 9A:
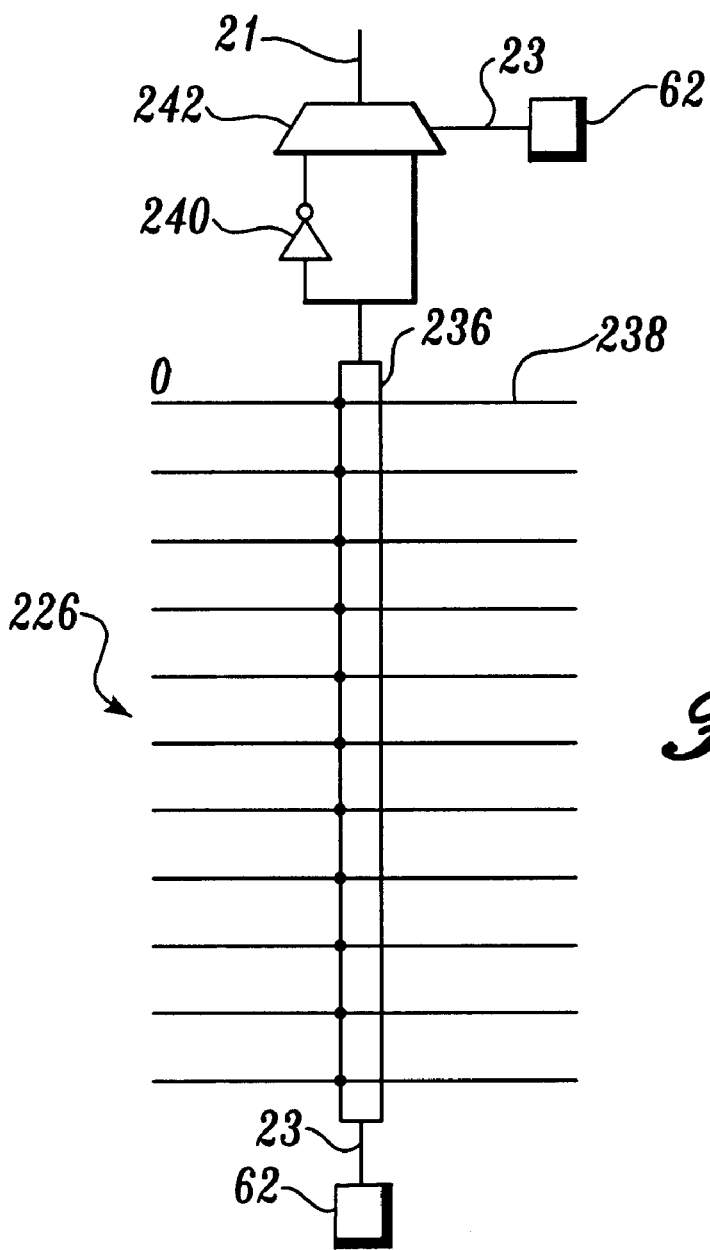
FIG. 9A is a detailed block diagram of a portion of an alternate control path.

FIG. 9A shows an alternative circuit for generating the dynamic control signals 21. Instead of the one-input LUT 220, this circuit includes a constant "0" bus 238, an inverter 240, and a two-input multiplexer 242. The constant "0" bus 238 is input to the multiplexer 236. The output from the multiplexer 236 is input to the inverter 240. The output of the inverter 240 is input to the two-input multiplexer 242. The output of the multiplexer 236 is also input to the two-input multiplexer 242. The two-input multiplexer 242 is coupled to receive a static control signal 23 from one of the memory cells 62. The two-input multiplexer 242 outputs the dynamic control signal 21.

Thus, the hardware that generates the control signals 20 and the configurable data path 12 has been explained. After an application has been mapped to the architecture 10, the architecture 10 is configured as follows. The static control signals 23 are set appropriately by the host 13. For the dynamic control signals 21 that remain unchanged during the computation, the one-input LUTs 220 are set to the appropriate constant, such as 0 or 1. For the dynamic control signals 21 that change during the computation, the one-input LUTs 220 are configured to compute the true or complement of the input, and the input is connected to the appropriate bus 226 by statically configuring the input multiplexer. The three-input LUTs 210 are programmed appropriately and their inputs and outputs are connected to the appropriate buses 226. The control instruction 16 inserted into the control path 18 on each cycle is compiled into a master control program that is executed by the controller 14.

Figure 10:
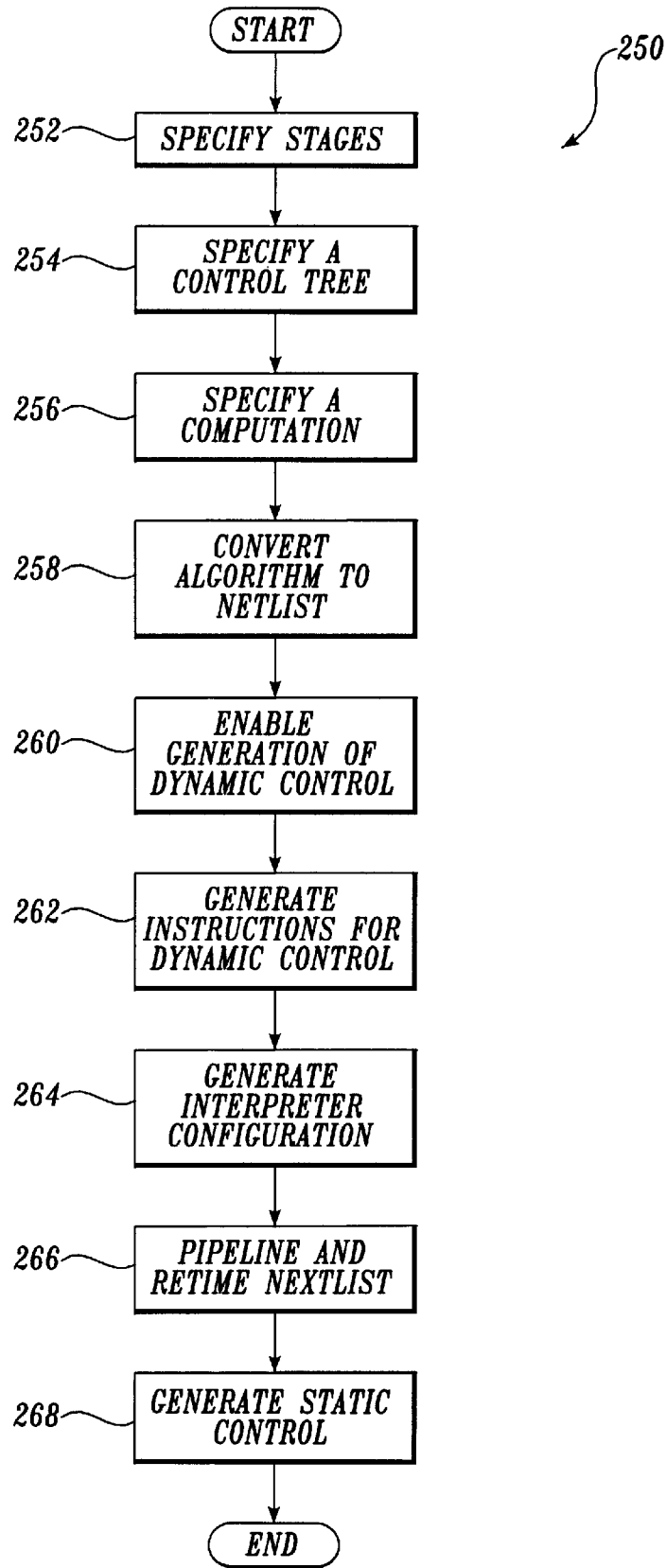
FIG. 10 is a flowchart of a method according to the present invention.

FIG. 10 shows a flowchart of a method 250 of mapping a computational application to the reconfigurable computing architecture 10. The method 250 begins by representing an algorithm in the form of a program. At a step 252, the number of computational stages 28 that are to be mapped to the architecture 10 is specified. At a step 254, a control tree that represents all execution cycles within the program is specified. At a step 256, the computation that is to be mapped to each of the stages 28 is specified, conditioned on Boolean expressions from the control tree. Now that the algorithm is represented by a program, at a step 258, the algorithm is converted to a netlist that includes the interconnected functional units as abstracted from the computation specification and dynamic control expressions that are abstracted from the control tree. At a step 260, a set of Boolean expressions is generated that enables the interpreters 208 to generate the dynamic control signals 21. At a step 262, the control instructions 16 are generated that specify the Boolean expressions passed to the interpreters 208 for every cycle within the control tree. At a step 264, the configuration of the interpreters is determined. At a step 266, the netlist is pipelined and retimed. At a step 268, static control signals 23 are generated for part of the netlist that does not vary and for the interpreters 208. Each of the steps of the method 250 will be explained in detail below.

Mapping a computational algorithm to the configurable computing architecture 10 begins with specification of the algorithm as a program in an acceptable language. In a presently preferred embodiment, a language referred to as RaPiD-B is used. The syntax of RaPiD-B is similar to that of C. The structure of the RaPiD-B program includes a stage specification; a control tree specification; a computation specification; and an input and output stream specification.

At the step 252, the algorithm is first broken down into the stages 28 that are similar, parallel units of computation. The implementation of the architecture 10 is taken into consideration to balance the computations performed per stage 28 and the number of stages 28 used. Although each stage 28 can be unique, differences that can occur across a set of stages 28 depend on the amount of dynamic configurability available in the architecture 10. It will be appreciated that most algorithms have many possible divisions into stages 28, but only some divisions will fit onto the architecture 10. For example, consider mapping a 28-tap Finite Impulse Response (FIR) filter to an architecture 10 that includes many ALUs 32 and registers 30 but is limited to sixteen multipliers 36. A partitioning of the 28-tap FIR filter that maps one tap per stage 28 requires twenty-eight stages having one multiplier 36 in each stage 28. The number of desired multipliers 36 therefore exceeds the number of available multipliers 36 on the target architecture 10. On the other hand, a partitioning that maps two taps per stage 28 requires fourteen stages having one multiplier 36 in each stage 28. This partitioning does not exceed the multiplication resources of the architecture 10.

At the step 254, the control tree is specified. The RaPiD-B program specifies the computation to be performed in each stage 28 on every cycle. Cycles of computation are first specified with a control tree. The control tree gives a distinct name to each cycle of computation. Moreover, the control tree provides a means for referring to a set of cycles. For example, it may be desirable to specify that, on a particular set of cycles, a particular set of memory arrays 150 is to be loaded. The control tree makes it possible to break down the large space of cycles into sets, allowing specific computations to be triggered in specific stages 28 based on control conditions, referred to as conditionals.

Figure 11A:
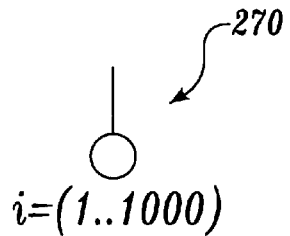
FIGS. 11A–11F are illustrations of control trees according to the present invention.
Figure 11B:
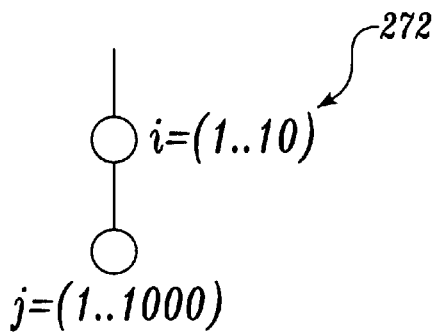
Figure 11C:
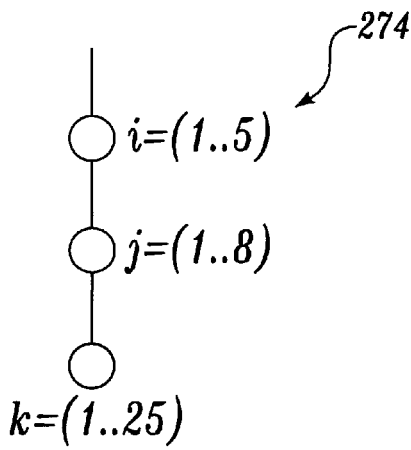

The control tree consists of nodes of various types and their connections. Each node in the control tree represents a control construct. The children of a given node are defined as all nodes connected to and lower in the tree than the given node. The control tree is based on a nested-loop specification. For nodes, with an associated variable and range, are the leaf nodes in the tree. In addition, For nodes can be nested. For example, FIGS. 11A–11C show three different control trees 270, 272, and 274, respectively, for a 1000-cycle program. Conditionals in the computation specification are formed from the For node variables. For example, it may be desired that an operation be performed at cycle 515. The condition on this operation would be (i==515) for the singly nested loop (FIG. 11A), (i==6 && j==16) for the doubly nested loop (FIG. 11B), and (i==3 && j==5 && k==15) for the triply nested loop (FIG. 11C). As another example, it may be desired that an operation be performed every 100th cycle. In this case, the conditions would be (i==100 ||i==200 || . . . i==1000), (j==100), and ( (j==4 ||j==8) && k==25) for the singly, doubly, and triply nested loops, respectively. The control tree allows the algorithm's control to be succinctly specified. Typically, the control tree reflects the nested-loop structure of the original algorithm.

Figure 11D:
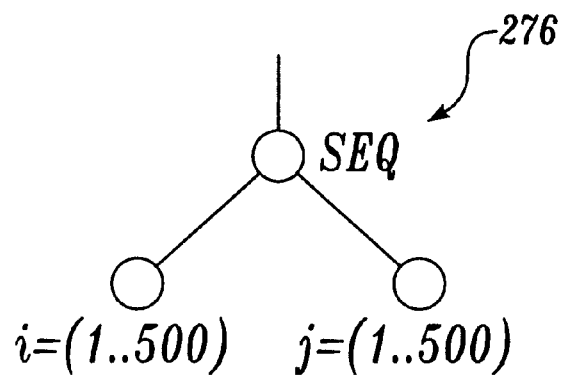
Figure 11E:
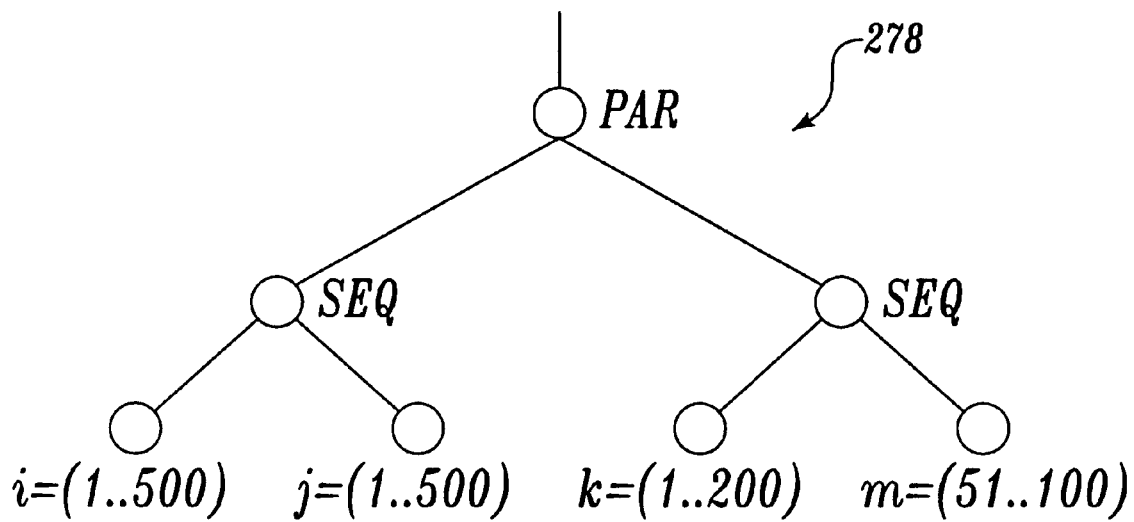

Many algorithms may be characterized as phases of separate computations that are sequential and/or overlapped. The control tree provides support for both parallel (Par) and sequential (Seq) nested loops. FIGS. 11D and 11E show 1000-cycle control trees 276 and 278 for two sequential loops and two parallel/sequential loops, respectively. In a parallel node, the node completes when all of its children have completed. Hence, the number of cycles in the control tree 278 (FIG. 11E) is 1000.

Figure 11F:
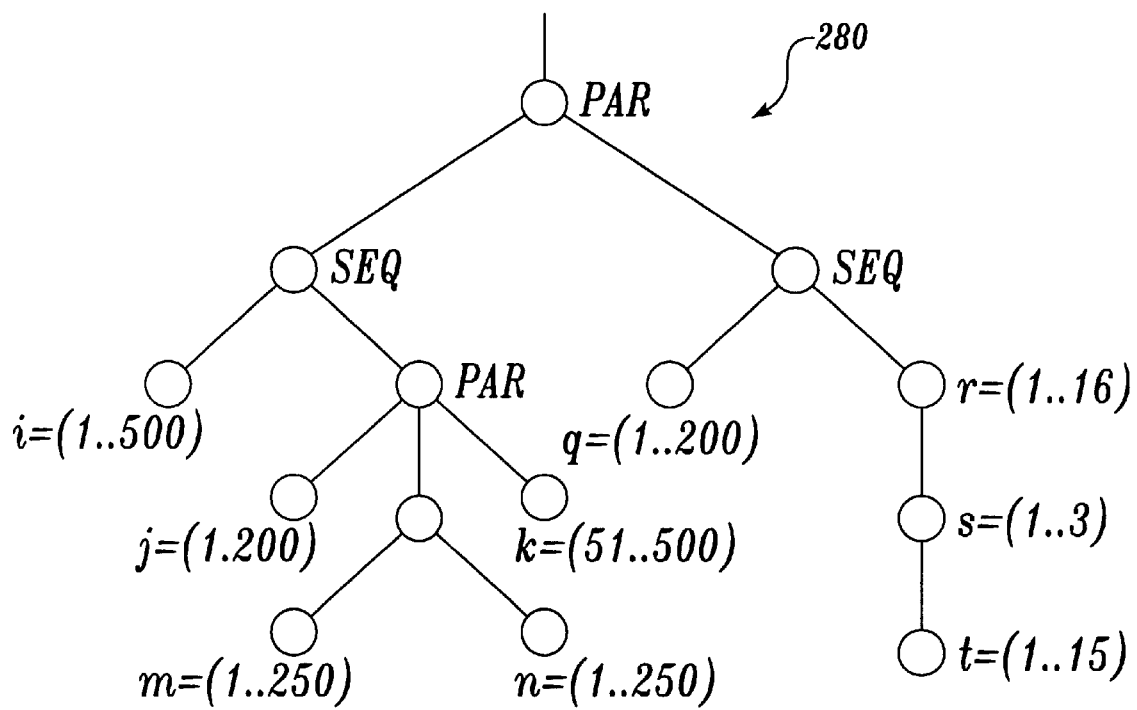

By using a combination of parallel, sequential, and nested loops, complex loop structures can be created. Since all loop bounds are static at application execution time, the total number of cycles represented by the tree can be statically determined. FIG. 11F shows a complex loop structure 280 that also specifies 1000 cycles.

Some operators have been added to the for node type to simplify the control specification. The operator live ( ) is true during cycles in which the target loop is being executed. In addition, the operators first ( ) and last ( ) are true during cycles in which the target loop is in its first and last iterations, respectively.

Definitions of all node types are as follows. A Seq node has one or more children and invokes each in sequence, one at a time. A Par node has one or more children, which are invoked in parallel. A Par node completes when all of its children complete. A For node has a variable, a range, and at most one child. On each new cycle, the For node assigns the next value in the range to its variable and executes its child, if one exists. A Wait node has an iteration value and a reference to a For node. A Wait node completes when the For node reaches the specified iteration value. A Wait node allows a branch of the control tree to synchronize with another branch of the tree that has been invoked in parallel. Wait nodes do not add any additional functionality to the control tree but, instead, simplify the computation of loop bounds. An Inf node has a variable and at most one child, which it invokes indefinitely. It has a predefined range of one to infinity. On each new cycle, the Inf node assigns the next value in the range to its variable and executes its child, if one exists. An Inf node is child of a Par node, and the Inf node does not play a role in the termination condition on the Par node. That is, the Par node completes when all of its non-Inf node children complete. An Inf node completes when its parent completes.

The computation is specified at the step 256. The computation specification details the computation and data communication that take place on every cycle in every stage. The specification takes the form of a simple loop over all cycles.

This loop executes the control tree—that is, for each iteration of the loop, all For node variables within the control tree are updated to reflect the current cycle. The program specifies the computation to be performed in every stage. This is done most easily with a loop over the stages. Then, the structure of the computation specification may be given as follows:

```
loop over every cycle in control tree
   loop over every stage
      [computation]
```

The statements of the [computation] block are formed from conditional statements in which the conditions are Boolean expressions of the control tree For nodes. Expressions containing operations of the ALU 32 and multiplications map to the ALUs 32, and the multipliers 36, respectively.

The language RaPiD-B 10 has several predefined types to support both computation and data communication within an algorithm, as shown in Table 1.

TABLE 1

| Data Type | Specifies |
|---|---|
| Instream | Input data stream |
| Outstream | Output data stream |
| Pipe | Construct to pass data between stages |
| Word | Single-width variable |
| Long | Double-width variable |
| Bool | Single bit value, used for conditional statements |
| Ram | Fixed-size RAM local to a stage |

In the RaPiD-B program, a variable s is predefined and acts as the stage iterator. The variable s is initially 0 and can be incremented, but not decremented. The computation section of the RaPiD-B program specifies what happens in each stage 28 via the code specified for every value of s. For example, the code shown below specifies that one of the multipliers 36 is needed in stage 0 and one of the ALUs 32 is needed in stage 4 on a 16-stage array:

```
for (s = 0; s < 16; s++){ if (s == 0)wX = wX + wY;

if (s == 4)wZ = wZ + wZ;

...

}
```

The types Instream and Outstream specify streams for data input to and output from the architecture 10. If the data is being read from or written to memory, the declaration of a stream includes an associated addressing pattern. Table 2 lists the stream operators: put and get. During initialization, the operator put inserts values into input streams according to an addressing pattern. During the RaPiD-B computation loop, the operator get removes values out of the input streams, and the operator put inserts values into the output streams. During finalization, the operator get removes values from the output streams and writes them to memory according to an addressing pattern. If no memory interface 24 is provided, values stream in and out via the ports 25 without an addressing specification.

TABLE 2

| Function | Action |
|---|---|
| x = inFoo.get() | Get the next stream value and store into the word x |
| inFoo.put(x) | Insert the word x to the end of the stream used to initialize input streams |
| outFoo.put(x) | Insert the word x at the end of the output stream |
| x = outFoo.get() | Get the next value from the stream and store in word x |

TABLE 3

| Operator | Action |
|---|---|
| pipeFoo.output(x) | Assigns the value x in the current stage s to an input to the next stage (s + 1) |
| y = pipeFoo.input() | Assigns the value assigned to pipefoo in the previous stage (s − 1) to the variable y |

The type Pipe is used to communicate values, such as values of the variable s across stages 28. The operators that apply to pipes are listed in Table 3. For example, a 32-stage RaPiD-B program that forwards an input stream to an output stream is shown below:

```
Instream in;
Outstream out;
...
Pipe pipe;
...
for (s=0; s<32; s++) {
    if (s==0) pipe.output(in.get());
    else if (s==3) out.put(pipe.input());
    else pipe.output (pipe.input ());
}
``` where the first stage 28 outputs the next input stream value into the pipe, the last stage 28 writes the pipe value to the output stream, and every intervening stage 28 forwards the pipe value to the next stage 28.

Only variables of the type Pipe can be referenced at different values of s. Pipes suitably have single delays or double delays when an application calls for multiple data streams traveling at different rates across the array. The Pipe constructor takes as a parameter the number of delay cycles per stage, with zero being the default.

The type Word is a fundamental data type in the RaPiD-B language. Its width represents the width of the data buses 38 within the architecture 10. Words are used to perform computations within a stage. For a computation that is similar across several stages, an array of words is typically defined, and a loop over is specified. For example, the code shown below performs multiplies in parallel in every stage 28:

```
Word wFoo[STAGES], wX[STAGES], wY[STAGES]

...

for (s = 0; s < STAGES; s++)
{
    wFoo[s] = wX[s] * wY[s];
}
```

In general, arithmetic operators that can be applied to integers in C can be applied to a Word.

The type Long is used for double-precision arithmetic. If the architecture 10 allows the ALUs 32 to be linked together for a wide add or provides a double-width output on one of the multipliers 36, then type Long should be used for such operations in the RaPiD-B program.

The type Bool is used for Boolean expressions from the control tree. Within the computation loop, the condition of an if statement is of the type Bool.

The type Ram specifies a fixed-size local memory 34 in a stage 28 of the architecture 10. RAM is accessed via an implicit address register that can be assigned, cleared, and incremented. Table 4 lists the valid operators for the data type Ram.

TABLE 4

| Operator | Action |
|---|---|
| ramFoo.address = x | Sets the address register to value x, mod size |
| ramFoo.address++ | Increment the address register, mod size |
| ramFoo = y | Set the ram value for the current address to y (y is of type Word) |
| y = ramFoo | Read the value for the current address |

At the step 258, the algorithm is converted to the netlist, that is a set of functional units and control units and their connections. As discussed above, each architecture specification contains the stage variable s that is nondecreasing. To output a flat netlist, that is, a netlist over all the stages 28, a compiler is preferred for building a separate netlist for each value of s, effectively unrolling all loops iterating over s.

However, it will be appreciated that this compilation is also suitably done by hand. Hence, for each value of s, all references to s are treated as a constant and folded along with all other constants in the code. For conditional statements that can be evaluated statically, all code that is not required for outputting values onto the output streams is removed. Dynamic conditional statements form multiplexers whose select input is tied to the dynamic condition. When the compiler notices that the variable s has increased, a stage boundary is formed.

Since the RaPiD-B has programming language semantics with no notion of a register, the compiler determines whether or not a variable must be registered by analyzing the read/write orderings of the code between two stage boundaries. To support such interloop dependencies, all variables are initialized as a register. Then, a netlist is generated by converting adds, subtracts, bitwise ops, etc., into the ALUs 32, multiplies into the multipliers 36, and if statements into the multiplexers 40.

For example, FIGS. 12A–E shows the netlist construction for a RaPiD-B loop. An inner loop of code is shown below:

```
for (s=0; s < N; s++) {
if (loop.first()) w[s].address=0;
if (loop.live()) foo[s] = w[s].address;
if (inc.live()) w[s].address++
...
}
```

Figure 12E:
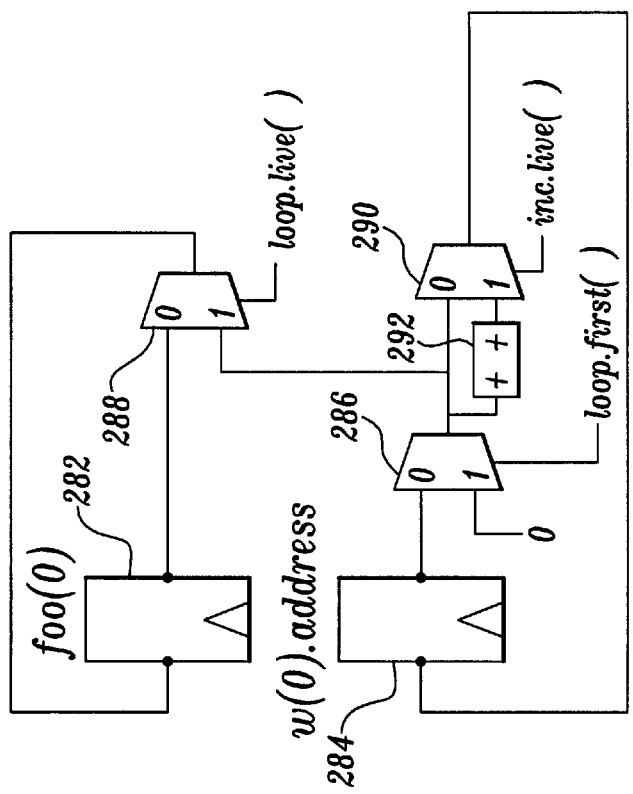
Figure 12D:
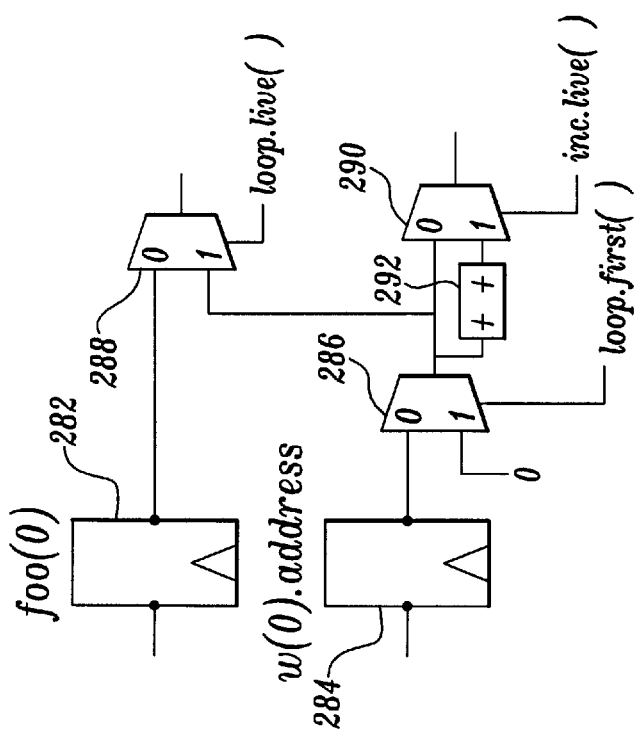

As shown in FIG. 12A, during the first iteration of the loop, the variable s is assigned a value of zero, thereby creating the variables foo [0] and w [0].address that are initialized as registers 282 and 284. As shown in FIG. 12B, the second line of code adds a multiplexer 286 to the address register 284 that either holds its current value or loads zero, depending on the value of loop.first ( ). As shown in FIG. 12C, the third line adds a multiplexer 288 to the register 282 and updates foo [0] to be the current value of the address register, if loop.live ( ) is true. As shown in FIG. 12D, the fourth line adds a multiplexer 290 to the multiplexer 286 and initiates an incrementer 292, and updates the value of the address register if inc.live ( ) is true. As shown in FIG. 12E, after the final reference to the variables foo [0] and w [0].address, the current values are connected as inputs to the original registers 282 and 284, providing support for dependencies across iterations of the control loop.

Referring back to FIG. 10, at the step 260, generation of dynamic control is enabled. The dynamic control signals 21 are formed from the dynamic conditionals found in the netlist generation. Although constant folding is performed, all dynamic conditionals are saved as a function of the variable s. By analyzing the dynamic variables within an expression, control can be extracted. For example, a RaPiD-B program may contain a For node i and a conditional expression (i==s). If i has an increment of one and a range from zero to the number of stages, then this conditional can be compiled into a doubly pipelined control line in which (i==0) is the control expression passed to the interpreters 208. Similarly, a conditional of the form (i==ks) can be realized by creating a control pipeline with k+1 registers per stage. A conditional that is not a function of s (e.g., i.live ( ) && j.first ( )) compiles directly to a singly pipelined control line.

At the step 264, a set of Boolean expressions for the control instruction 16 is found that, through a series of decoding steps within the interpreters 208, can generate the dynamic signals 21 for a particular implementation of the architecture 10. A set of inputs is preferably at most the number of available inputs to the interpreters 208. This process involves finding common subexpressions within the dynamic control signals 21. In addition, this process may suitably entail Shannon decomposition and/or compilation to state machines, depending on the number of available inputs to the interpreters 208 and the flexibility of the interpreters 208.

Although the functional units and memories in the architecture 20 may be pipelined, the RaPiD-B program specifies only unpipelined units. As a result, at the step 266 the final netlist is retimed to adhere to the architecture's pipeline structure. In addition, retiming can be applied as desired to improve performance.

The static settings are completely specified at the step 268 after the previous steps are complete. An SRAM bit is configured for each unvarying control bit within the target architecture. At the beginning of an application, a sequence of all static control bits must be loaded into the architecture's memory cells 62, including the statically compiled program that generates the dynamic control signals 21.

Figure 13A:
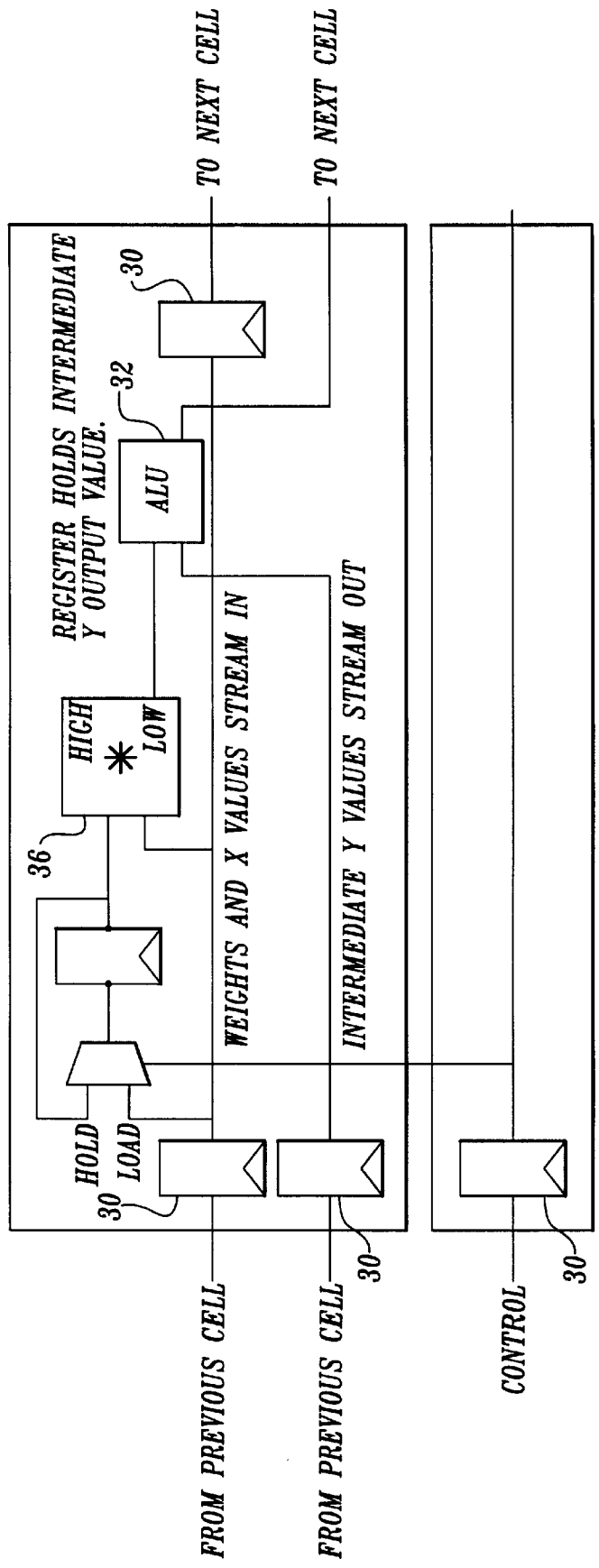
FIGS. 13A–13D illustrate an exemplary application of the present invention.
Figure 13B:
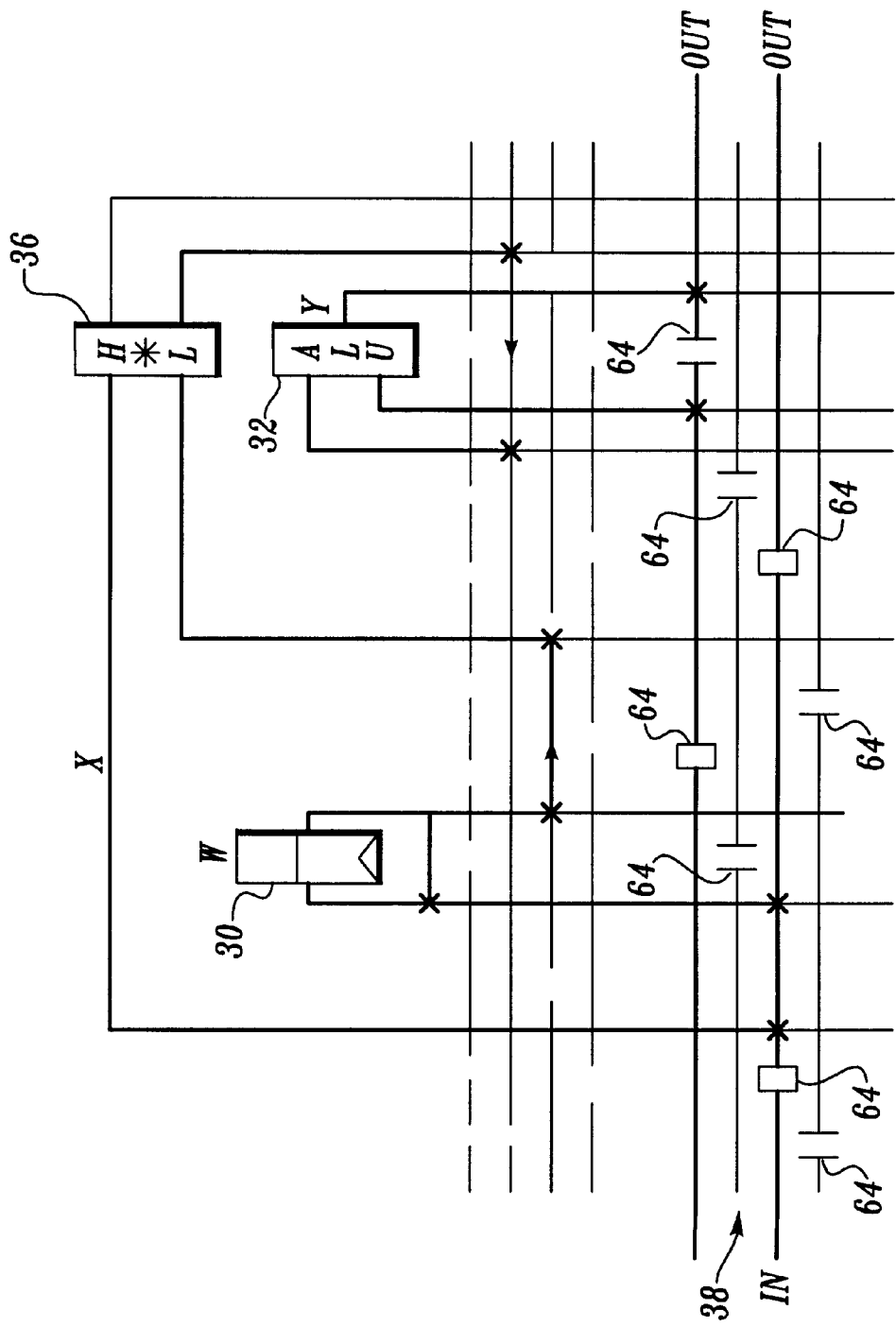
Figure 13C:
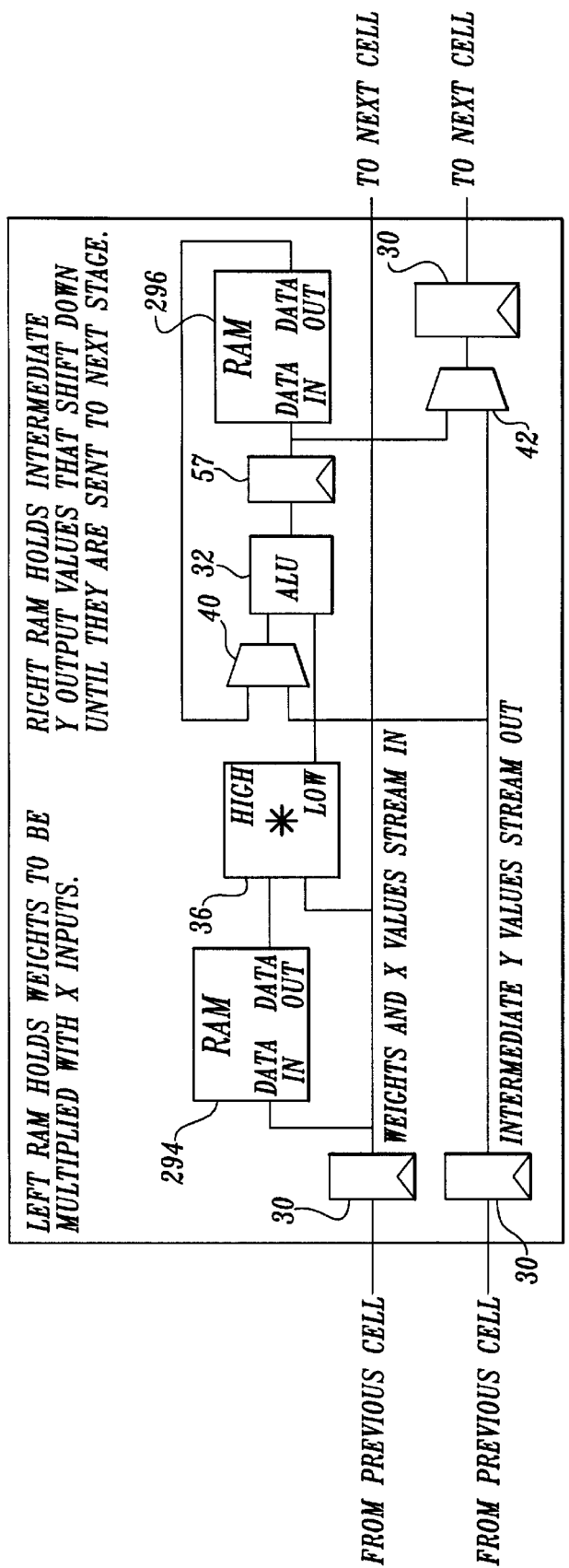

Exemplary Application of the Present Invention: Finite Impulse Response FIR) Filter FIGS. 13A–13C show a finite impulse response (FIR) filter that is representative of an exemplary application of the present invention. The application shown in FIGS. 13A–13C is given by way of nonlimiting example only. Other suitable applications of the present invention include, but are not limited to, a matrix multiplier, a motion estimator, and a discrete-cosine transform. It will be appreciated that none of the applications mentioned above limit application of the present invention, but are given by way of nonlimiting example only.

FIGS. 13A–13C show a FIR filter that is mapped to the architecture 10. As with most applications, there are a variety of ways to map a FIR filter to the architecture. The choice of mapping is driven by the parameters of both the architecture array and the application. For example, if the number of taps is less than the number of the architecture multipliers, then each multiplier is assigned to multiply a specific weight. The weights are first preloaded into data path registers whose outputs drive the input of a specific multiplier. Pipeline registers are used to stream the X inputs and Y outputs. Since each Y output must see Num Taps inputs, the X and Y buses are pipelined at different rates. FIG. 13A shows the configuration on one cell of the FIR filter. The X input bus was chosen to be doubly pipelined and the Y input bus singly pipelined.

This implementation maps easily to the architecture array, as shown for one tap in FIG. 13B. For clarity, all unused functional units are removed, and used buses 38 are highlighted. The bus connectors 64 are left open to represent no connection and boxed to represent a register. The control for this mapping consists of two phases of execution: loading the weights and computing the output results. In the first phase, the weights are sent down the IN double pipeline along with a singly pipelined control bit which sets the state of each data path register 30 to "LOAD." When the final weight is inserted, the control bit is switched to "HOLD." Since the control bit travels twice as fast as the weights, each data path register 30 will hold a unique weight. No special signals are required to begin the computation; hence, the second phase is started the moment the control bit is set to "HOLD."

As shown in FIG. 13C, if the number of weights exceeds the number of the architecture multipliers 36, the multipliers 36 are time-shared between several weights. This can be achieved in the architecture by using a local memory 294 to store several weights per stage 28. This mapping has doubly pipelined the Y output values instead of the X input values, as done previously in the sample case.

As a new X is read from memory, the first stage 28 replicates it and presents it for several cycles on the input data path. Each stage 28 can multiply this X by its weights in turn and add it to one of its stored intermediate values. At this point a new X value will be fetched from memory and the cycle repeats.

There are the same number of intermediate values as there are weights per stage 28. These intermediate values are stored in a second local memory 296. Assume the weights $W_n$, $W_{n-1}$, $W_{n-2}$, and $W_{n-3}$ are stored in a stage, and a new input value $X_i$ appears on the input data path. In four cycles the partial sums for $Y_{n+i}$, $Y_{n+i-1}$, $Y_{n+i-2}$, and $Y_{n+i-3}$ will be computed. These are stored in that order in the local memory 296 holding the intermediate values.

At this point, $X_i$ moves to the next pipeline stage 28 along with the one intermediate value $Y_{n+i-3}$. The next input, $X_{i+1}$, appears on the input data path along with the intermediate value $Y_{n+i+1}$ from the previous stage 28. Now the partial sums for $Y_{n+i+1}$, $Y_{n+i}$, $Y_{n+i-1}$, and $Y_{n+i-2}$ are computed. As in the simple case, the pipeline contains a static vector of weights and dynamic vectors of input values and intermediate output values. In this case, however, local memories are used to store the vectors. It takes four cycles to incorporate one input value into the intermediate results, then every four cycles the vector of intermediate outputs and inputs is shifted one stage down the array. The output shifted out of the last stage 28 is sent to the output stream.

Figure 13D:
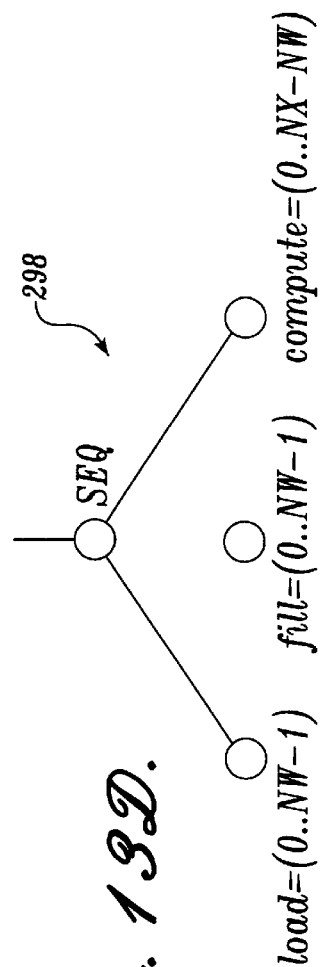

One implementation of a RaPiD-B program for the FIR filter with a number of taps less than the number of multipliers is as follows. The FIR filter is specified as three sequential loops: one to load the weights, one to preload the pipeline with data, and one to perform the computation while loading the remaining data. A control tree 298 for NW weights and NX input values is shown in FIG. 13D. The code shown below first declares a weight input stream, a data input stream, and a Y output stream, with a simple linear addressing to external RAM (not shown):

```
Instream inW, inx;
Outstream outY;
Word wInput, wResult, w[NW];
Pipe pipeData(1), pipeResult;
Loop over every cycle in control tree {
    for (s=0; s<NW; s++) {
        if (load.live()) {
            if (s==0) wInput = inW.get();
            else wInput = pipeData.input();
            if (load.last()) w[s] = wInput;
            pipeData.output (wInput);
        }
        if (fill.live()) {
            if (s==0) wInput = inX.get();
            else wInput = pipeData.input();
            pipeData.output (wInput);
        }
        if (compute.live()) {
            if (s==0) wInput = inx.get();
            else wInput = pipeData.input();
```

-continued

```
            if (s==0) wResult = wInput*w[0];
            else wResult = pipeResult.input()+wInput*w[s];
            pipeData.output (wInput);
            if (s==NW-1) outY.put(wResult)
            else pipeData.output(wResult);
        }
    }
}
```

Temporary variables wInput and wResult store a stage's input and output, respectively, and the w array stores one weight per stage 28. The pipes pipeData and pipeResult pass the input and output data between stages 28. Note that pipeData is singly pipelined.

The first phase of the loop loads the weights. First, the single pipeline pipeData is preloaded with NW−1 weights. On the last cycle of the load loop, the weights in pipedata are stored in the w array. The second phase simply fills the pipeline with data values. Computation cannot begin until there is an X value in every stage 28; hence, the fill loop takes NW cycles. The final phase performs the multiply-accumulate computation. Each stage multiplies its stored weight with the value of pipeData, and the results are accumulated over pipeResult. In addition, the last stage puts the final result into the outY output stream. During the compute loop, one output result is produced per control tree cycle.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A reconfigurable computing architecture for executing a plurality of applications, each application being executed over a plurality of execution cycles, the architecture comprising:

a plurality of functional units that are interconnectably arranged to perform a plurality of functions on data, the data comprising a plurality of bits;

a plurality of interconnectors that selectably interconnect the functional units to control the flow of data between the functional units;

a set of first signals generated to create a state that remains unchanged over the execution cycles of any one of the applications;

a set of second signals generated to create a plurality of states that are changeable over the execution cycles; and an input and an output for data, wherein the function being performed on the data by the functional units is selectable by the first signals and the second signals and the interconnectors are arranged in a single dimension to transport the data from the input and to the output and to provide the data to the functional units, the interconnectors interconnect the functional units such that the flow of the data between the functional units is selectable.

2. The computing architecture of claim 1, wherein the interconnectors include a plurality of rows of buses.

3. The computing architecture of claim 2, wherein the buses include a plurality of interconnected segmented buses.

4. The computing architecture of claim 3, wherein the segmented buses are interconnected by a plurality of bus connectors that transfer the data between the interconnected segmented buses.

5. The computing architecture of claim 4, wherein the bus connectors are controlled in response to the set of first signals.

6. The computing architecture of claim 4, wherein the bus connectors are controlled in response to the set of second signals.

7. The computing architecture of claim 4, wherein the bus connectors are controlled in response to the set of first signals and the set of second signals.

8. The computing architecture of claim 4, wherein the bus connectors include registers.

9. The computing architecture of claim 2, wherein each functional unit has an input terminal, and wherein the interconnectors further include a plurality of multiplexers, the multiplexers connecting the input terminals of the functional units to the buses.

10. The computing architecture of claim 9, wherein the multiplexers are coupled to receive the second signals, the multiplexers selecting the buses for connection to the functional units in response to the second signals.

11. The computing architecture of claim 9, wherein the multiplexers are coupled to receive the first signals, the multiplexers selecting the buses for connection to the functional units in response to the first signals.

12. The computing architecture of claim 9, wherein the multiplexers are coupled to receive the first and second signals, the multiplexers selecting the buses for connection to the functional units in response to the first and second signals.

13. The computing architecture of claim 2, wherein each functional unit has an output terminal, and wherein the interconnectors further include a plurality of switches, the switches connecting the output terminals of the functional units to the buses.

14. The computing architecture of claim 13, wherein the switches are coupled to receive the first signals, the switches selecting the buses for connection to the functional units in response to the first signals.

15. The computing architecture of claim 13, wherein the switches are coupled to receive the second signals, the switches selecting the buses for connection to the functional units in response to the second signals.

16. The computing architecture of claim 13, wherein the switches are coupled to receive the first and second signals, the switches selecting the buses for connection to the functional units in response to the first and second signals.

17. The computing architecture of claim 1, wherein the function performed by the functional unit is selectable by the first signal.

18. The computing architecture of claim 1, wherein the function performed by the functional unit is selectable by the second signal.

19. The computing architecture of claim 1, wherein the function performed by the functional unit is selectable by the first and second signals.

20. The computing architecture of claim 1, wherein the functional units include a multiplier.

21. The computing architecture of claim 1, wherein the functional units include an arithmetic logic unit.

22. The computing architecture of claim 1, wherein the functional units include a memory cell array.

23. The computing architecture of claim 1, wherein the functional units include a register.

24. The computing architecture of claim 1, wherein the functional units include a general purpose configurable unit.

25. The computing architecture of claim 1, wherein the functional units provide a set of third signals for use in generating the set of second signals.

26. The computing architecture of claim 1, wherein the first signals are stored in a plurality of memory cells, the memory cells being coupled to provide the first signals to the functional units.

27. The computing architecture of claim 1, wherein the first signals are stored in a plurality of memory cells, the memory cells being coupled to provide the first signals to the interconnectors.

28. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units being selectable by the first signals and the second signals; and means for interconnecting the functional units that are arranged in a single dimension to transport the data between the input and output means and to provide the data to the functional units, the functional units being interconnected by the means for interconnecting the functional units such that the flow of data between the functional units is selectable, wherein the data operated on by the functional units comprises a plurality of bits.

29. The computing architecture of claim 28, wherein the means for interconnecting the interpreters include a plurality of rows of control buses.

30. The computing architecture of claim 29, wherein the buses include a plurality of interconnected segmented control buses.

31. The computing architecture of claim 30, wherein the segmented control buses are interconnected by a plurality of control bus connectors.

32. The computing architecture of claim 31, wherein the control bus connectors include registers.

33. The computing architecture of claim 31, wherein the control bus connectors are controlled in response to the set of first signals.

34. The computing architecture of claim 28, wherein each interpreter includes means for generating an output signal.

35. The computing architecture of claim 34, wherein the output signal-generating means generates the set of second signals.

36. The computing architecture of claim 34, wherein the output signal-generating means includes an input terminal coupled to receive an input signal, the output signal being selected from a group of signals consisting of the input signal, a logic complement of the input signal, a logic zero, and a logic 1.

37. The computing architecture of claim 36, wherein the output signal-generating means includes a lookup table.

38. The computing architecture of claim 37, wherein the lookup table includes a one-input lookup table.

39. The computing architecture of claim 29, wherein each interpreter includes means for generating an output signal.

40. The computing architecture of claim 39, wherein the output signal-generating means includes an input terminal, and wherein the means for interconnecting the interpreters further includes a plurality of multiplexers, the multiplexers connecting the input terminals of the output signal-generating means to the control buses.

41. The computing architecture of claim 39, wherein the means for generating the output signal has an output terminal, and wherein the means for interconnecting the control buses further includes a plurality of switches, the switches connecting the output terminals of the output signal-generating means to the control buses.

42. The computing architecture of claim 34, wherein each output signal generating means includes an input terminal and an output terminal, the input terminal of one of the output signal generating means being coupled to the output terminal of a different output signal generating means.

43. The computing architecture of claim 34, wherein the output signal-generating means includes a lookup table.

44. The computing architecture of claim 43, wherein the lookup table is a three-input lookup table.

45. The computing architecture of claim 34, wherein the output signal-generating means are controlled by the first signals.

46. The computing architecture of claim 28, wherein the functional units provide a set of third signals to the interpreters.

47. The computing architecture of claim 28, wherein the means for generating the set of instructions includes a processor.

48. The architecture of claim 28, wherein the means for generating the set of instructions includes an array of memory cells.

49. A method of mapping a computational application to a reconfigurable computing architecture for executing a plurality of applications, each application being executed over a plurality of execution cycles, the architecture including means for generating a set of first signals having a state that remains unchanged over the execution cycles of any one of the applications; means for generating a set of instructions having states that are changeable over the execution cycles; a linear array of interpreters that receive the set of instructions and provide a set of second signals having states that are changeable over the execution cycles; means for interconnecting the interpreters; means for inputting and outputting data; a linear array of interconnectable functional units, each functional unit being arranged to perform a plurality of functions on the data, the function being performed on the data by the array being selectable by the first signals and the second signals; and means for interconnecting the functional units that are arranged to receive the data from the input and output means and to provide the data to the functional units, the functional units being interconnected by the means for interconnecting the functional units such that the flow of data between the functional units is selectable, the method comprising:

specifying a number of computational stages to map to the array;

specifying a control tree that represents execution cycles within the application;

specifying a computation to be mapped to the stages;

converting the computation specification to a specification of the interconnected functional units, the second control signals being labeled with a set of the first expressions derived from variables in the control tree;

generating a set of second expressions from the set of first expressions, the second expressions representing the set of instructions that are input to the interpreters;

generating a configuration of the interpreters for enabling the interpreters to convert the second expressions into the first expressions; and generating the configuration of the remaining signals in the first set.

50. The method of claim 49, further comprising revising the specification of interconnected functional units.

51. The method of claim 50, wherein revising the specification of interconnected functional units adds registers to the specification of interconnected functional units.

52. The method of claim 50, wherein revising the specification of interconnected functional units deletes registers from the specification of interconnected functional units.

53. The computing architecture of claim 1, wherein the data comprises at least 4 bits.

54. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of second signals having states that are changeable over the execution cycles;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units, the interconnecting means being arranged to transport the data between the input and output means and to provide the data to the functional units, the interconnecting means interconnecting the functional units such that flow of the data between the functional units is selectable, wherein each functional unit has an input terminal and wherein the interconnecting means include a plurality of rows of buses and a plurality of multiplexers, the multiplexers connecting the input terminals of the functional units to the buses.

55. The computing architecture of claim 54, wherein the multiplexers are coupled to receive the second signals, the multiplexers selecting the buses for connection to the functional units in response to the second signals.

56. The computing architecture of claim 54, wherein the multiplexers are coupled to receive the first signals, the multiplexers selecting the buses for connection to the functional units in response to the first signals.

57. The computing architecture of claim 54, wherein the multiplexers are coupled to receive the first and second signals, the multiplexers selecting the buses for connection to the functional units in response to the first and second signals.

58. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of second signals having states that are changeable over the execution cycles;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units, the interconnecting means being arranged to transport the data between the input and output means and to provide the data to the functional units, the interconnecting means interconnecting the functional units such that flow of the data between the functional units is selectable, wherein each functional unit has an output terminal and wherein the interconnecting means include a plurality of rows of buses and a plurality of switches, the switches connecting the output terminals of the functional units to the buses.

59. The computing architecture of claim 58, wherein the switches are coupled to receive the first signals, the switches selecting the buses for connection to the functional units in response to the first signals.

60. The computing architecture of claim 58, wherein the switches are coupled to receive the second signals, the switches selecting the buses for connection to the functional units in response to the second signals.

61. The computing architecture of claim 58, wherein the switches are coupled to receive the first and second signals, the switches selecting the buses for connection to the functional units in response to the first and second signals.

62. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units that are arranged to transport the data between the input and output means and to provide the data to the functional units, the functional units being interconnected by the means for interconnecting the functional units such that the flow of data between the functional units is selectable, wherein each interpreter includes means for generating an output signal and the output signal-generating means generates the set of second signals.

63. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units that are arranged to transport the data between the input and output means and to provide the data to the functional units, the functional units being interconnected by the means for interconnecting the functional units such that the flow of data between the functional units is selectable, wherein each interpreter includes means for generating an output signal and the output signal-generating means includes an input terminal coupled to receive an input signal, the output signal being selected from a group of signals consisting of the input signal, a logic complement of the input signal, a logic zero, and a logic 1.

64. The computing architecture of claim 63, wherein the output signal-generating means includes a lookup table.

65. The computing architecture of claim 64, wherein the lookup table includes a one-input lookup table.

66. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units that are arranged to transport the data between the input and output means and to provide the data to the functional units, the functional units being interconnected by the means for interconnecting the functional units such that the flow of data between the functional units is selectable, wherein the means for interconnecting the interpreters include a plurality of rows of control buses and each interpreter includes means for generating an output signal.

67. The computing architecture of claim 66, wherein the output signal-generating means includes an input terminal, and wherein the means for interconnecting the interpreters further includes a plurality of multiplexers, the multiplexers connecting the input terminals of the output signal-generating means to the control buses.

68. The computing architecture of claim 66, wherein the means for generating the output signal has an output terminal, and wherein the means for interconnecting the control buses further includes a plurality of switches, the switches connecting the output terminals of the output signal-generating means to the control buses.

69. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units that are arranged to transport the data between the input and output means and to provide the data to the functional units, the functional units being interconnected by the means for interconnecting the functional units such that the flow of data between the functional units is selectable, wherein each interpreter includes means for generating an output signal and each output signal generating means includes an input terminal and an output terminal, the input terminal of one of the output signal generating means being coupled to the output terminal of a different output signal generating means.

70. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units that are arranged to transport the data between the input and output means and to provide the data to the functional units, the functional units being interconnected by the means for interconnecting the functional units such that the flow of data between the functional units is selectable, wherein each interpreter includes means for generating an output signal and the output signal-generating means includes a lookup table.

71. The reconfigurable computing architecture of claim 70, wherein the lookup table is a three-input lookup table.

72. A reconfigurable computing architecture for executing a plurality of applications, each application being executed over a plurality of execution cycles, the architecture comprising:

means for generating a set of first signals having a state that remains unchanged over the execution cycles of any one of the applications;

means for generating a set of instructions having states that are changeable over the execution cycles;

a linear array of interpreters that receive the set of instructions and provide a set of second signals having states that are changeable over the execution cycles;

means for interconnecting the interpreters;

means for inputting and outputting data;

a linear array of interconnectable functional units, each functional unit being arranged to perform a plurality of functions on the data, the function being performed on the data by the functional units is selectable by the first signals and the second signals; and means for interconnecting the functional units that are arranged to transport the data between the input and output means and to provide the data to the functional units, the functional units being interconnected by the means for interconnecting the functional units such that the flow of data between the functional units is selectable, wherein each interpreter includes means for generating an output signal and the output signal-generating means are controlled by the first signals.

73. A method of mapping a computational program to a reconfigurable computing architecture configured for executing one of a plurality of applications, each application being executed over a plurality of execution cycles, the method comprising:

specifying a plurality of computational stages to map to the architecture, each computational stage corresponding to one execution cycle;

specifying a control tree that represents all computations to be perform for every execution cycle for each stage within the program, the control list including expressions;

specifying a computation for each of the computational stages based on the expressions in the control tree for that execution cycle;

converting the computation specification to a listing that specifies an arrangement for interconnecting a plurality of functional units in a linear array and that specifies a set of second control signals derived from the control tree, the second control signals providing dynamic controls to change the state during an execution cycle;

generating a set of second expressions that enable a plurality of interpreters to generate dynamic control signals;

generating a set of control instructions that specify the second expression for input to the interpreters for each execution cycle of the control tree;

determining a configuration of the interpreters; and pipelining the listing to adhere to the architecture, wherein pipelining includes generating static control signals for a part of the list that does not vary, these static control signals being loaded into the architecture to define an application on which the dynamic portion of the program is executed.

74. The method of claim 73, further comprising revising the list of interconnected functional units.

75. The method of claim 73, wherein revising the list of interconnected functional units adds registers to the list of interconnected functional units.

76. The method of claim 73, wherein revising the list of interconnected functional units deletes registers from the list of interconnected functional units.

* * * * *

UNITED STATES PATENT AND TRADEMARK OFFICE
CERTIFICATE OF CORRECTION

PATENT NO. : 6,023,742
DATED : February 8, 2000
INVENTOR(S) : W.H.C. Ebeling et al.

It is certified that error appears in the above-indentified patent and that said Letters Patent is hereby corrected as shown below:

| COLUMN | LINE | |
|---|---|---|
| 25 through 28 | 27 22 | Claims 62-72 were canceled and should not appear in the letters patent |

Signed and Sealed this

Twenty-seventh Day of March, 2001

Attest:

Attesting Officer

NICHOLAS P. GODICI

*Acting Director of the United States Patent and Trademark Office*